United States Patent
Anderson et al.

(10) Patent No.: US 10,632,756 B2
(45) Date of Patent: Apr. 28, 2020

(54) FLUID LEVEL SENSORS

(71) Applicant: HEWLETT-PACKARD DEVELOPMENT COMPANY, L.P., Houston, TX (US)

(72) Inventors: Daryl E. Anderson, Corvallis, OR (US); James Michael Gardner, Corvallis, OR (US); Berkeley Fisher, Corvallis, OR (US); Scott A. Linn, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/094,638

(22) PCT Filed: Jul. 19, 2016

(86) PCT No.: PCT/US2016/042984
§ 371 (c)(1),
(2) Date: Oct. 18, 2018

(87) PCT Pub. No.: WO2018/017066
PCT Pub. Date: Jan. 25, 2018

(65) Prior Publication Data
US 2019/0126632 A1    May 2, 2019

(51) Int. Cl.
*B41J 2/175*   (2006.01)
*G01F 23/00*   (2006.01)

(52) U.S. Cl.
CPC ...... *B41J 2/17566* (2013.01); *G01F 23/0069* (2013.01)

(58) Field of Classification Search
CPC .......... B41J 2/17566; B41J 2002/17569; B41J 2002/17573; B41J 2002/17576;
(Continued)

(56) References Cited

U.S. PATENT DOCUMENTS 5,635,962 A    6/1997   Goldis
5,836,007 A    11/1998  Clinton
(Continued)

FOREIGN PATENT DOCUMENTS

WO    WO-2012102701 A1    8/2012
WO    WO-2016068954       5/2016

OTHER PUBLICATIONS

Paczesny; "The Capacitive Sensor for Liquid Level Measurement Made with Ink-jet Printing Technology"; Eurosensors 2015.
(Continued)

*Primary Examiner* — Kristal Feggins
(74) *Attorney, Agent, or Firm* — Fabian VanCott

(57) ABSTRACT

In one example, a fluid level sensor includes control logic, and an array of sensing locations to detect a level of fluid in a container. The array of sensing locations include a number of memory cells located at a number of sensing locations in the array of sensing locations, a word line coupled to the memory cells, a bit line coupled to the memory cells, and a pre-charge circuit coupled to the word line and the bit line. The control logic instructs a number FETs coupled to a bit line to disconnect from a number of the memory cells, and power up the memory cells to cause the memory cells to take a first state or a second state. The control logic outputs the state of the memory cells to a processing device. The state of the memory cells defines the level of the fluid in the container.

20 Claims, 13 Drawing Sheets

(58) Field of Classification Search
CPC .... B41J 2002/17579; B41J 2002/17583; B41J 2002/17586; B41J 2002/17589
See application file for complete search history.

(56) References Cited

U.S. PATENT DOCUMENTS

| | | |
|---|---|---|
| 5,900,888 A | 5/1999 | Kurosawa |
| 6,641,240 B2 | 11/2003 | Hsu et al. |
| 6,785,176 B2 | 8/2004 | Demone |
| 7,129,749 B1 | 10/2006 | Fenstermaker |
| 7,555,231 B2 | 6/2009 | Etter et al. |
| 8,215,734 B2 | 7/2012 | Asauchi |
| 8,289,788 B2 | 10/2012 | Asauchi |
| 8,491,111 B2 | 7/2013 | Gray et al. |
| 9,233,550 B2 | 1/2016 | Aida |
| 2006/0028860 A1 | 2/2006 | Lien et al. |
| 2014/0035616 A1 | 2/2014 | Oda et al. |
| 2014/0204148 A1 | 7/2014 | Ge et al. |
| 2014/0204684 A1 | 7/2014 | Kwak et al. |
| 2015/0273848 A1 | 10/2015 | Ge et al. |

OTHER PUBLICATIONS

"Thermal Jet Ink Jet System"; Oct. 3, 2013; https://www.diagraph.com/Portals/0/IntranetDocs/LCIJ/Manuals/5780-320_RevN.pdf.

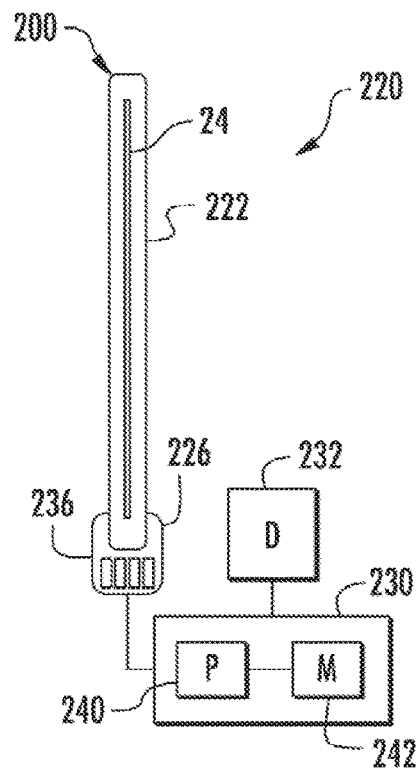
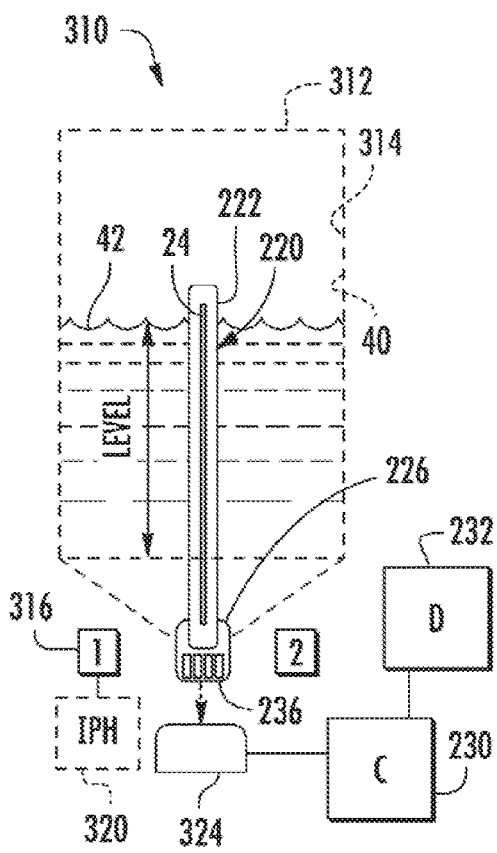
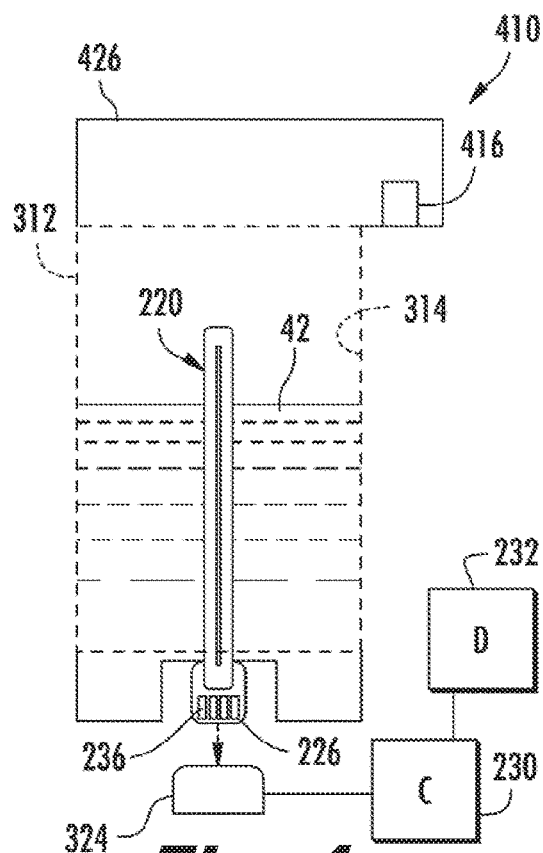
Fig. 2
Fig. 3
Fig. 4

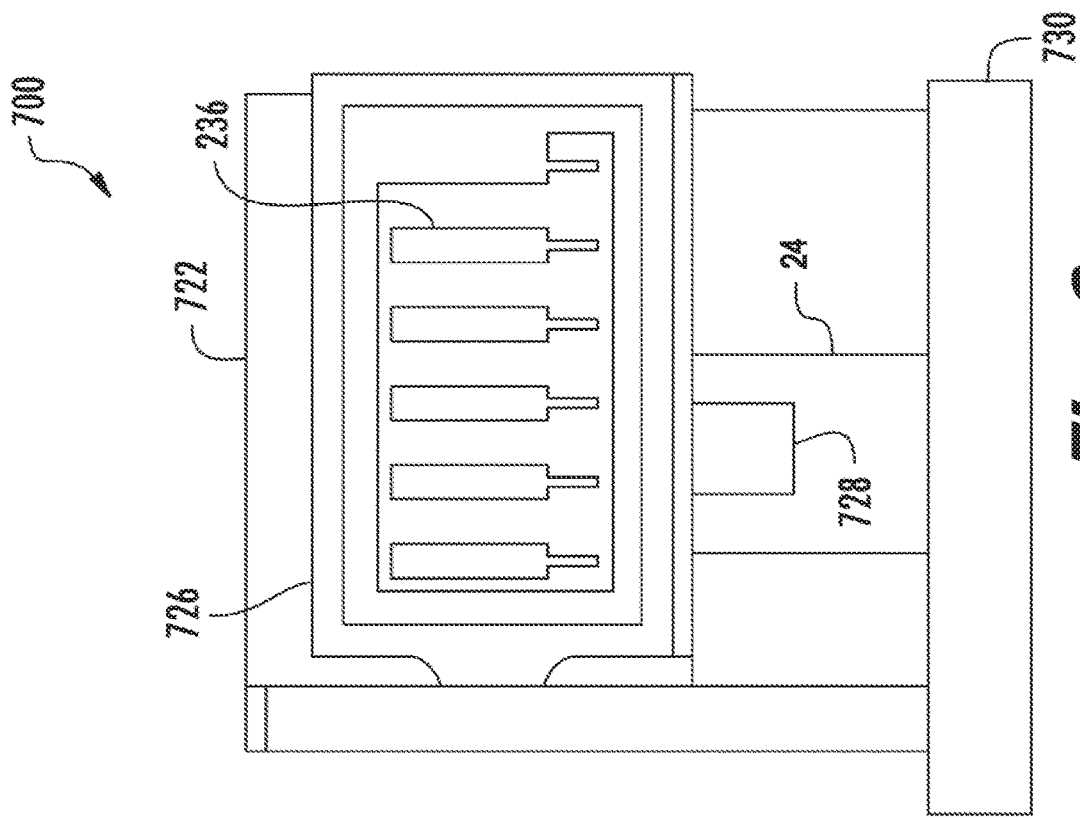
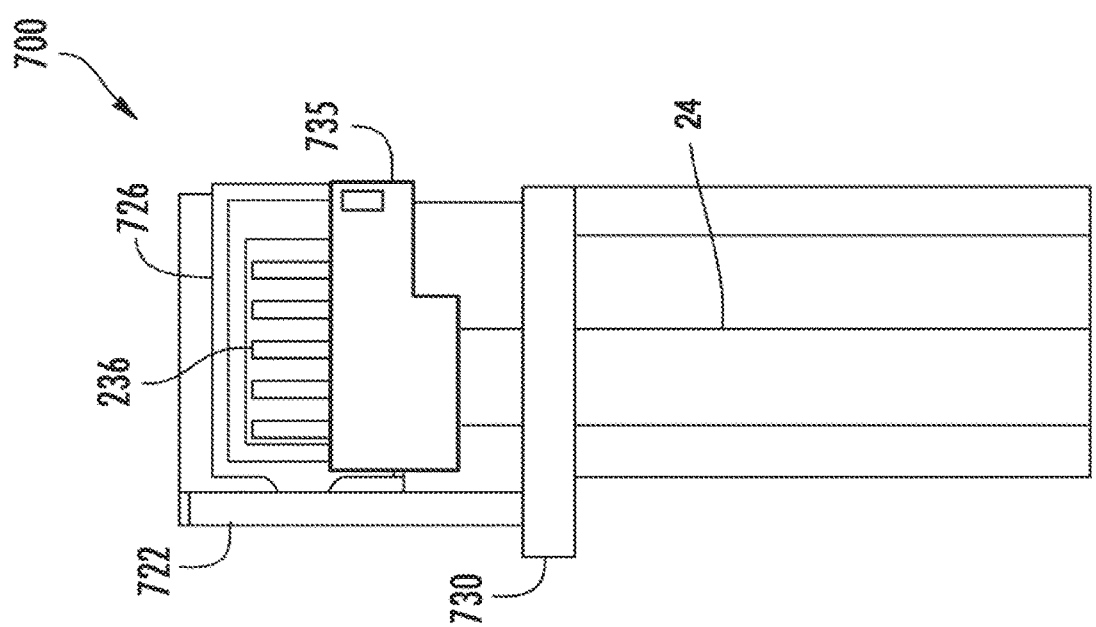

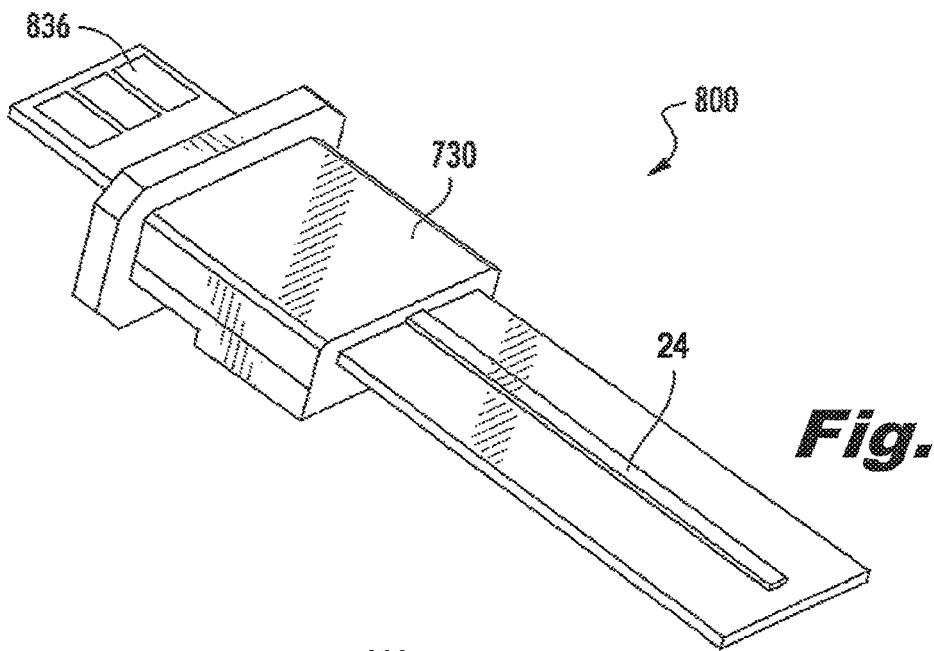
*Fig. 7*
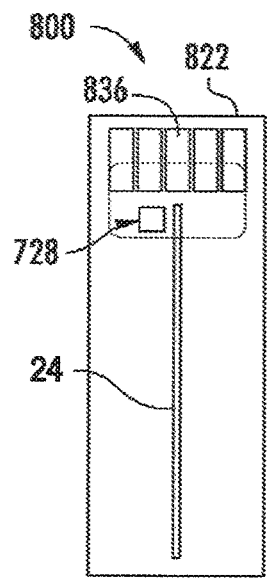
*Fig. 8*
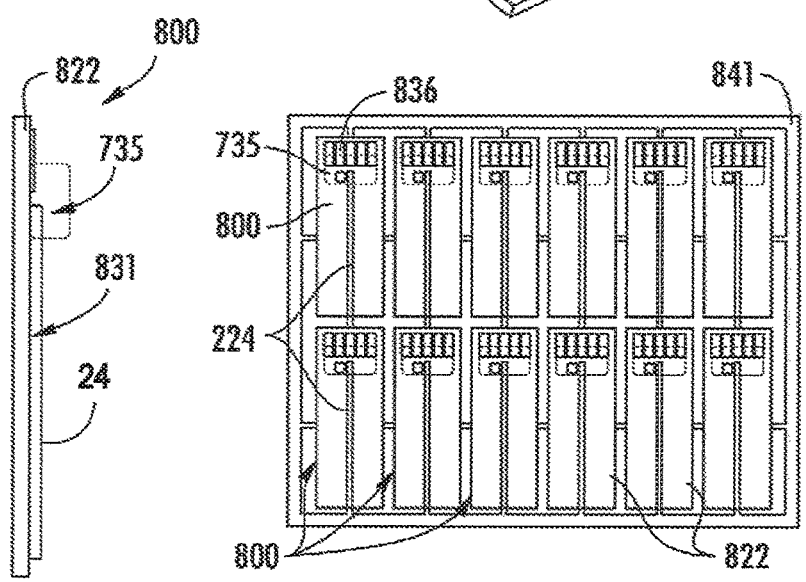
*Fig. 9*     *Fig. 11*
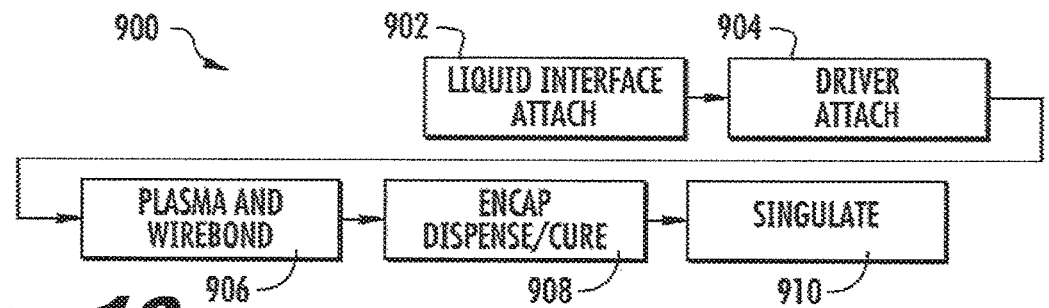
*Fig. 10*

FLUID LEVEL SENSORS

BACKGROUND

Printing devices eject printable fluid onto print media in order to form an image or a structure on the print media. The printable fluid may be stored in a reservoir or other volume from which a printing device draws the printable fluid. Over time, the level or amount of printable fluid within the reservoir is depleted.

BRIEF DESCRIPTION OF THE DRAWINGS

The accompanying drawings illustrate various examples of the principles described herein and are a part of the specification. The illustrated examples are given merely for illustration, and do not limit the scope of the claims.

FIG. 2 is a diagram of a liquid level sensing system, according to one example of the principles described herein.

FIG. 3 is a diagram of a liquid supply system including the liquid level sensing system of FIG. 2, according to one example of the principles described herein.

FIG. 4 diagram of a liquid supply system including the liquid level sensing system of FIG. 2, according to another example of the principles described herein.

FIG. 5 is a diagram of a fluid level sensor, according to another example of the principles described herein.

FIG. 6 is an enlarged view of a portion of the fluid level sensor of FIG. 5, according to one example of the principles described herein.

FIG. 7 is a perspective view of a fluid level sensor, according to another example of the principles described herein.

FIG. 8 is a front view of the fluid level sensor of FIG. 7, according to one example of the principles described herein.

FIG. 9 is a sectional view of the fluid level sensor of FIG. 8, according to one example of the principles described herein.

FIG. 10 is a flow diagram of a method for forming the fluid level sensor of FIG. 7, according to one example of the principles described herein.

FIG. 11 is a front view of a panel upon which multiple fluid level sensors have been formed, prior to singulation, according to one example of the principles described herein.

Throughout the drawings, identical reference numbers designate similar, but not necessarily identical, elements.

DETAILED DESCRIPTION

Figure 1A:
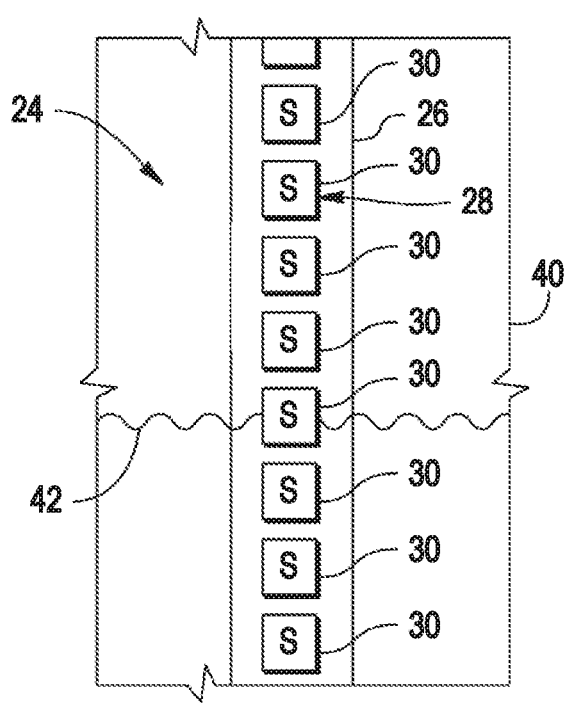
FIG. 1A is a diagram of a portion of a liquid interface for a fluid level sensor, according to one example of the principles described herein.

As mentioned above, over time, the level or amount of printable fluid within the reservoir is depleted as the printing device utilizes the printable fluid. A number of devices may be used to sense and determine the level or amount of printable fluid within the reservoir of printable fluid. In some examples, the devices used to sense and determine the amount of printable fluid within the reservoir may be complex and expensive to manufacture.

False printable fluid levels or inaccurate readouts cause consumers of printable fluid devices to be dissatisfied with such a product. More reliable and accurate fluid level sensors may cause a consumer base to have a better user experience. Thus, it is desirable to accurately measure the level of ink in a container at a minimal cost to the manufacturer and the end consumer. Using a silicon die as a sensing device is one method to detect a level or amount of printable fluid. However, silicon is a relatively expensive material, and it is also desirable to make the printable fluid level sensor as small of a device as possible. It may also be desirable to have as simple of a data communication protocol as possible, and for the printable fluid level sensor to communicate information to a printer controller or other processing device within a printing device via digital signals, rather than analog signals.

Examples described herein provide a fluid level sensor that includes control logic, and an array of sensing locations to detect a level of fluid in a container. The array of sensing locations include a number of memory cells located at a number of sensing locations in the array of sensing locations, a word line coupled to the memory cells, a bit line coupled to the memory cells, and a pre-charge circuit coupled to the word line and the bit line. The control logic instructs a number of field effect transistors (FETs) coupled to a bit line to disconnect from a number of the memory cells. The control logic powers up the memory cells. The powering up of the memory cells causes the memory cells to take a first state or a second state. The control logic outputs the state of the memory cells to a processing device. The state of the memory cells defines the level of the fluid in the container.

Outputting the state of the memory cells includes, with the control logic, instructing a pre-charging circuit coupled to the bit line to pre-charging the memory cells to a midpoint state, instructing the pre-charging circuit to end the pre-charging of the memory cells, and instructing the FETs to connect to the memory cells. The output state of the memory cells is based on a presence or absence of the fluid at the sensing locations as biased by an electrical component electrically coupled to the fluid. The sensing locations define a plurality of fluid levels. The memory cell includes the number of FETs coupled to the word line and the bit line, a number of inverters coupled to the FETs, and a first capacitor to bias the memory cell. The electrical component includes a second capacitor in capacitive contact with a fluid container, the second capacitor biasing the memory cell to the first state or the second state. Whether the memory cell is biased to the first state or the second state is based on which of the first capacitor or the second capacitor has a larger capacitance. The memory cell includes the number of FETs coupled to the word line and the bit line, a number of inverters coupled to the FETs, and a first capacitor to bias the memory cell. The electrical component comprises an electrode in electrical contact with a fluid container, the electrode biasing the memory cell to the first state or the second state based on a level of conductance at the electrode. The memory cells relay the first or second state of the memory cells to a register.

Examples described herein provide a print cartridge. The print cartridge includes a fluid level sensor. The fluid level sensor includes an array of sensing locations associated with a plurality of fluid levels to detect a level of printable fluid within the print cartridge. The fluid level sensor includes control logic. Each sensing location includes a number of memory cells located at a number of sensing locations in the array of sensing locations, a word line coupled to the memory cells, a bit line coupled to the memory cells, and a pre-charge circuit coupled to the word line and the bit line. The control logic instructs a number of field effect transistors (FETs) coupled to a bit line to disconnect from a number of the memory cells, powers up the memory cells, the powering up of the memory cells causing the memory cells to take a first state or a second state, and output the state of the memory cells to a processing device, the state of the memory cells defining the level of the fluid in the container. The control logic controls actuation of the sensing locations. The memory cell is a static random access memory (SRAM) device within a SRAM column, one of a plurality of SRAM devices within the SRAM column each being associated with the array of sensing locations.

The memory cell includes a number of field-effect transistors (FETs) coupled to the word line and the bit line, a number of inverters coupled to the FETs, and a first capacitor to bias the memory cell. The electrical component includes a second capacitor in capacitive contact with a fluid container, the second capacitor biasing the memory cell to the first state or the second state. Whether the memory cell is biased to the first state or the second state is based on which of the first capacitor or the second capacitor has a larger capacitance. The memory cell includes a number of field-effect transistors (FETs) coupled to the word line and the bit line, a number of inverters coupled to the FETs, and a first capacitor to bias the memory cell. The electrical component includes an electrode in electrical contact with a fluid container, the electrode biasing the memory cell to the first state or the second state based on a level of conductance at the electrode. The pre-charge circuit applies a ½ VDD to the bit line and a bit line bar to pull the state of the memory cells to a midpoint state. The pre-charge circuit includes two pre-charging FETs, the ½ VDD being applied to the two pre-charging FETs, and a shorting FET to short the bit line and the bit line bar to balance the bit line with the bit line bar.

Examples described herein provide a method of detecting a level of fluid in a container. The method includes disconnecting a number of field effect transistors (FETs) coupled to a bit line from a number of memory cells located at a number of sensing locations in an array of sensing locations, powering up the memory cells, the powering up of the memory cells causing the memory cells to take a first state or a second state, and reading the state of the memory cells to determine a level of fluid in a container. Reading the state of the memory cells includes, with a pre-charging circuit coupled to the bit line, pre-charging the memory cells to a midpoint state, ending the pre-charging of the memory cells, and connecting the FETs to the memory cells. The state of the memory cells is based on a presence or absence of fluid at the sensing locations as biased by an electrical component electrically coupled to the fluid. The powering up of the memory cells to cause the memory cells to take a first state or a second state is based on a bias applied to the memory cell from a first capacitor and an electrical component coupled to the memory cell.

As used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Turning now to the figures, FIG. 1 depicts a liquid level sensing interface (24) for a fluid level sensor, according to one example of the principles described herein. Liquid level sensing interface (24) interacts with liquid within a volume (40) and outputs signals that indicate the current level of liquid within the volume (40). Such signals are processed to determine the level of liquid within the volume (40). Liquid level sensing interface (24) facilitates the detection of the level of liquid within the volume (40) in a low-cost manner.

As schematically shown by FIG. 1, liquid level sensing interface (24) includes strip or die (26), a series (28) of sensing locations (30). The die (26) includes an elongated strip that is to be extended into volume (40) containing the liquid (42). The die (26) supports the sensing locations (30) such that a subset of the sensing locations (30) are submersed within the liquid (42), when the liquid (42) is present.

In one example, the die (26) is supported from the top or from the bottom such that those portions of the die (26), and their supported sensing locations (30), submersed within the liquid (42), are completely surrounded on all sides by the liquid (42). In another example, the die (26) is supported along a side of the volume (40) such that a face of the die (26) adjacent the side of the volume (40) is not opposed by the liquid (42). In one example, the die (26) includes an elongated rectangular, substantially flat strip. In another example the die (26) includes a strip including a different polygon cross-section or a circular or oval cross-section. In one example, any number of die (26) may be coupled in series via an interface to form a seamless array of sensing locations (30). In this example, the sensing locations (30) may be placed along a plurality of die (26) such that the sensing locations (30) are located along the plurality of die (26) to accurately and precisely measure the level of the printable fluid (42) in the liquid container (FIG. 3, 312). Forming a series of dies (26) that runs the length of the liquid container (FIG. 3, 312) allows for the measurement of printable fluid (42) in a liquid container that is deeper.

The sensing locations (30) include individual elements or groups of elements spaced along a length of the die (26). In one example, each sensing locations (30) is independently actuatable independent of other sensing locations (30). In another example, a plurality of the sensing locations (30) may be actuatable as a group.

In the example depicted, the sensing locations (30) are supported by the die (26) so as to be arranged along the length of the die (26). For purposes of this disclosure, the term "support" or "supported by" with respect to the sensing locations (30) and a die (26) means that the sensing locations (30) are carried by the die (26) such that the die (26) and sensing locations (30) form a single connected unit. Such sensing locations (30) may be supported on the outside or within an interior of the die (26).

In one example, each sensing location (30) is spaced no greater than 20 µm from an adjacent sensing locations (30). In one example, the sensing locations (30) have a minimum one-dimensional density along die (26) of at least 100 sensing locations (30) per inch (at least 40 sensing locations (30) per centimeter). The one dimensional density includes a number of sensing locations (30) per unit measure in a direction along the length of the die (26), the dimension of the die (26) extending to different depths, defining the depth or liquid level sensing resolution of the liquid level sensing interface (24). In other examples, the sensing locations (30) have other one dimensional densities along the die (26). For example, the sensing locations (30) have a one-dimensional density along the die (26) of at least 10 sensing locations (30) per inch. In other examples, the sensing locations (30) may have a one-dimensional density along the die (26) on the order of 1000 sensing locations (30) per inch (400 sensing locations (30) per centimeter) or greater.

Figure 1B:
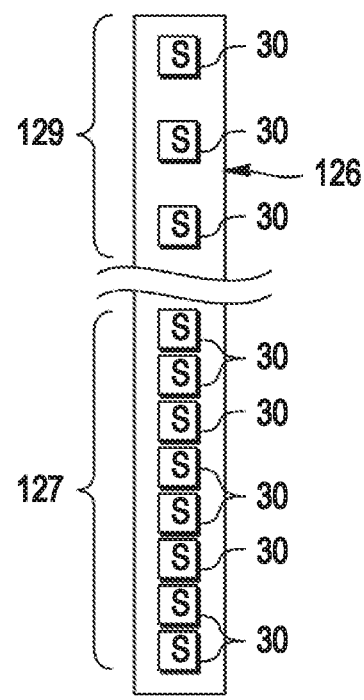
FIG. 1B is a diagram of portions of a liquid interface for a fluid level sensor, according to another example of the principles described herein.

In some examples, the vertical density or number of sensing locations (30) per vertical centimeter or inch may vary along the vertical or longitudinal length of the die (26). FIG. 1B depicts an example sensor strip (126) including a varying density of sensing locations (30) along its major dimension or launching a length. In the example depicted, the sensor strip (126) has greater density of sensing locations (30) in those regions along the vertical height or depth may benefit more from a greater degree of depth resolution. In the example depicted, the sensor strip (126) has a lower portion (127) including a first density of sensing locations (30) and an upper portion (129) including a second density of sensing locations (30), the second density being less than the first density. In such an example, the sensor strip (126) provides a higher degree of accuracy or resolution as the level of the liquid within the volume approaches an empty state. In one example, the lower portion (127) has a density of at least (40) sensing locations (30) per centimeter while upper portion (129) has a density of less than 10 sensing locations (30) per centimeter, and in one example, 4 sensing locations (30) per centimeter. In yet other examples, an upper portion or a middle portion of the sensor strip (126) may alternatively have a greater density of sensing locations (30) as compared to other portions of the sensor strip (126).

Each of the sensing locations (30) is selectively actuatable under the control of a controller. In one example, the controller is part of or carried by the die (26). In another example, the controller includes a remote controller electrically connected to the sensing locations (30) on the die (26). In one example, the liquid level sensing interface (24) includes a separate component from the controller, facilitating replacement of the liquid level sensing interface (24) or facilitating the control of multiple interfaces (24) by a separate controller.

FIG. 2 is a diagram of an example liquid level sensing system (220). Liquid level sensing system (220) includes a carrier (222), the liquid level sensing interface (24) described above, an electrical interconnect (226), a controller (230) and a display (232). The carrier (222) includes a structure that supports the die (26). In one example, the carrier (222) includes a die (26) formed from, or that includes, a polymer, glass or other material. In one example, the carrier (222) has embedded electrical traces or conductors. For example, the carrier (222) includes composite material composed of woven fiberglass cloth with an epoxy resin binder. In one example, the carrier (222) includes a glass-reinforced epoxy laminate sheet, tube, rod, or printed circuit board.

Liquid level sensing interface (24), described above, extends along a length of the carrier (222). In one example, the liquid level sensing interface (24) is glued, bonded or otherwise affixed to the carrier (222). In some examples, depending upon the thickness and strength of the die (26), the carrier (222) may be omitted.

The electrical interconnect (226) includes an interface by which signals from the sensing locations (30) of liquid level sensing interface (24) as depicted in FIG. 1 are transmitted to the controller (230). In one example, the electrical interconnect (226) includes electrical contact pads (236). In other examples, the electrical interconnect (226) may have other forms. The electrical interconnect (226), the carrier (222) and the die (26), collectively, form a fluid level sensor (200) that may be incorporated into and fixed as part of a liquid container volume or may be a separate portable sensing device which may be temporarily manually inserted into different liquid containers or volumes.

The controller (230) includes a processing unit (240) and associated non-transient computer-readable medium or memory (242). In one example, the controller (230) is separate from fluid level sensor (200). In other examples, controller (230) is incorporated as part of the sensor (200). Processing unit (240) files instructions contained in memory (242). For purposes of this application, the term "processing unit" shall mean a presently developed or future developed processing unit that executes sequences of instructions contained in a memory. Execution of the sequences of instructions causes the processing unit to generate control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, the controller (230) may be embodied as part of at least one application-specific integrated circuits (ASICs). Unless otherwise specifically noted, the controller (230) is not limited to any specific combination of hardware circuitry and software, nor to any particular source for the instructions executed by the processing unit.

The processing unit (240), following instructions contained in the memory (242), carries out the methods described herein. The processor (240), following instructions provided in the memory (242), selectively actuates the sensing locations (30). The processor (240), following instructions provided in the memory (242), obtains data signals from the sensing locations (30). Processor (240), following instructions provided in memory (242), determines a level of liquid (42) within the volume (40) based upon the signals from the sensing locations (30). As noted above, in some examples, the controller (230) may additionally determine an amount or volume of liquid (42) using characteristics of the volume (40) or chamber containing the liquid (42).

In one example, the display (232) receives signals from the controller (230), and presents visible data based upon the determined level of liquid (42) and/or determined volume or amount of liquid (42) within the volume (40). In one example, display (232) presents an icon or other graphic depicting a percentage of the volume (40) that is filled with the liquid (42). In another example, the display (232) presents an alphanumeric indication of the level of liquid (42) or percent of the volume (40) that is filled with the liquid (42) or that has been emptied of the liquid (42). In yet another example, the display (232) presents an alert or "acceptable" status based on the determined level of the liquid (42) within the volume (40). In yet other examples, the display (232) may be omitted, wherein the determined level of liquid within the volume is used to automatically trigger an event such as the reordering of replenishment liquid, the actuation of a valve to add a liquid to the volume or the actuation of the valve to terminate the ongoing addition of liquid (42) to the volume (40).

FIG. 3 is a sectional view depicting a liquid level sensing system (220) incorporated as part of a liquid supply system (310). The liquid supply system (310) includes a liquid container (312), a chamber (314) and a fluid or liquid ports (316). The container (312) defines the chamber (314). The chamber (314) forms an example volume (40) in which the liquid (42) is contained. As shown by FIG. 3, the carrier (222) and the liquid level sensing interface (24) project into the chamber (314) from a bottom side of the chamber (314), facilitating liquid level determinations as the chamber (314) nears a state of being completely empty. In other examples, the carrier (222) of the liquid level sensing interface (24) may alternatively be suspended from a top of the chamber (314).

The liquid ports (316) include liquid passes by which liquid from within the chamber (314) is delivered and directed to an external recipient. In one example, the liquid ports (316) include a valve or other mechanism facilitating selective discharge of liquid from the chamber (314). In one example, the liquid supply system (310) includes an off-axis ink supply for a printing system. In another example, the liquid supply system (310) additionally includes a print head (320) which is fluidly coupled to the chamber (314) to receive the liquid (42) from the chamber (314) through the liquid interface (316). In one example, the liquid supply system (310), including the print head (320), may form a print cartridge. For purposes of this disclosure, the term "fluidly coupled" means that two or more fluid transmitting volumes are connected directly to one another or are connected to one another by intermediate volumes or spaces such that fluid may flow from one volume into the other volume.

In the example depicted in FIG. 3, communication between the controller (230), which is remote or separate from liquid supply system (310), is facilitated via a wiring connector (324) such as a universal serial bus connector or other type of connector. The controller (230) and the display (232) operate as described above.

FIG. 4 is a sectional view depicting a liquid supply system (410); another example of the liquid supply system (310). The liquid supply system (410) is similar to the liquid supply system (310) except that the liquid supply system (410) includes a liquid port (416) in place of the liquid port (316). The liquid port (416) is similar to the interface of the liquid port (316) except that the liquid port (416) is provided in a cap (426) above the chamber (314) of the container (312). Those remaining components of system (410) which correspond to components of system (310) are numbered similarly.

FIGS. 5 and 6 depict a fluid level sensor (700), according to one example of the principles described herein. The sensor (700) includes a carrier (722), a liquid interface (24), an electrical interface (726), a driver (728), and a collar (730). The carrier (722) is similar to the carrier (222) described above. In the example depicted, the carrier (722) includes a molded polymer. In other examples, the carrier (722) may include a glass or other materials.

The liquid level sensing interface (24) is described above. The liquid level sensing interface (24) is bonded, glued, or otherwise adhered to a face of the carrier (722) along the length of the carrier (722). The carrier (722) may be formed from, or include, glass, polymers, FR4, or other materials.

The electrical interface (726) includes a printed circuit board including electrical contact pads (236) for making an electrical connection with the controller (230) described herein. In the example depicted, electrical interface (726) is bonded or otherwise adhered to the carrier (722). The electrical interface (726) is electrically connected to the driver (728) as well as the sensing locations (30) of the liquid level sensing interface (24). In one example, the driver (728) includes an application-specific integrated circuit (ASIC) which drives the sensing locations (30) in response to signals received through the electrical interface (726). In other examples, the actuation of the sensing locations (30) may alternatively be controlled by a fully integrated driver circuit in lieu of an ASIC.

The collar (730) extends about the carrier (722), and serves as a supply integration interface between carrier (722) and the liquid container (40) in which the sensor (700) is used to detect the level of the liquid (42) within the volume (40). In some examples, the collar (730) provides a liquid seal, separating liquid contained within the volume (40) that is being sensed and electrical interface (726). As shown by FIG. 5, in some examples, the driver (728) as well as the electrical connections between driver (728), the liquid level sensing interface (24), and the electrical interface (726) are further covered by a protective electrically insulating wire bond adhesive or encapsulant (735) such as a layer of epoxy molding compound.

FIGS. 7-9 depict a fluid level sensor (800), according to one example of the principles described herein. The sensor (800) is similar to sensor (700) except that the sensor (800) of FIGS. 7-9 includes a carrier (822) in place of the carrier (722), and omits the electrical interface (726). The carrier (822) includes a printed circuit board or other structure including embedded electrical traces and contact pads to facilitate electrical connection between various electronic components mounted upon the carrier (822). In one example, the carrier (822) includes a composite material composed of woven fiberglass cloth with an epoxy resin binder. In one example, the carrier (822) includes a glass-reinforced epoxy laminate sheet, tube, rod or printed circuit board, such as an FR4 printed circuit board.

As shown by FIGS. 8 and 9, the liquid level sensing interface (24) is bonded to the carrier (822) by a die attach adhesive (831). The liquid level sensing interface (24) is further wire bonded to the driver (728) and the electrical contact pads (836) provided as part of the carrier (822). The encapsulant (735) overlays or covers the wire bonds between the liquid level sensing interface (24), the driver (728), and the electrical contact pads (836). As shown by FIG. 7, the collar (730) is positioned about the encapsulant (735) between a lower end of liquid level sensing interface (24) and the electrical contact pads (836).

Figure 12A:
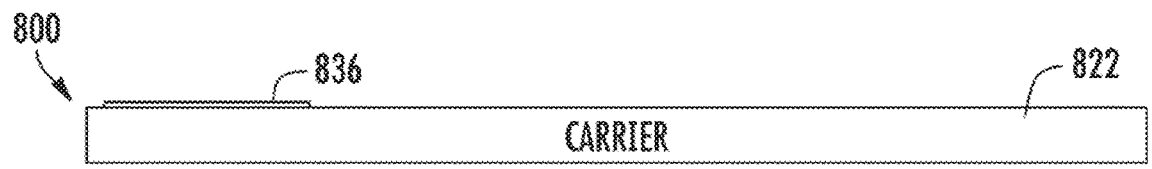
FIGS. 12A-12E are sectional views depicting the fluid level sensor of FIG. 7 as it is being formed, according to one example of the principles described herein.
Figure 12B:
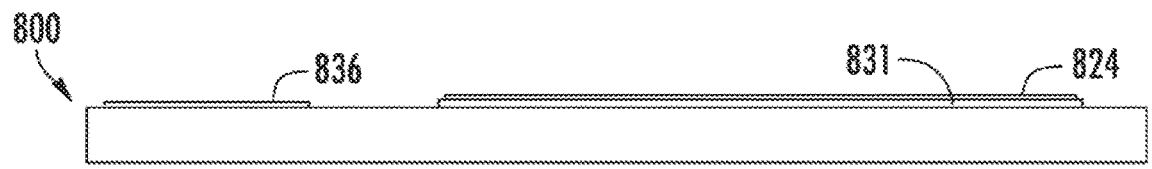

FIGS. 10, 11 and 12A-12E depict a method for forming a fluid level sensor (800), according to one example of the principles described herein. FIG. 10 depicts a method (900) for forming the fluid level sensor (800). As indicated by block 902, the liquid level sensing interface (24) is attached to the carrier (822). As indicated by block 904, the driver (728) is also attached to the carrier (822). FIG. 12A depicts the carrier (822) prior to the attachment of liquid level sensing interface (24) and driver (728). FIG. 12B depicts the sensor (800) after the attachment of the interface (224) and the driver (728) depicted in FIG. 8 with the adhesive layer (831). In one example, the adhesive layer (831) is stamped upon the carrier (822) to precisely locate the adhesive layer (831). In one example, the attachment of the liquid interface to (24) the driver (728) further includes curing of the adhesive layer (831).

Figure 12C:
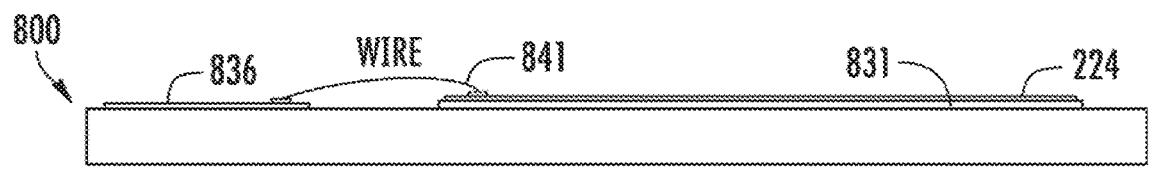
Figure 12D:
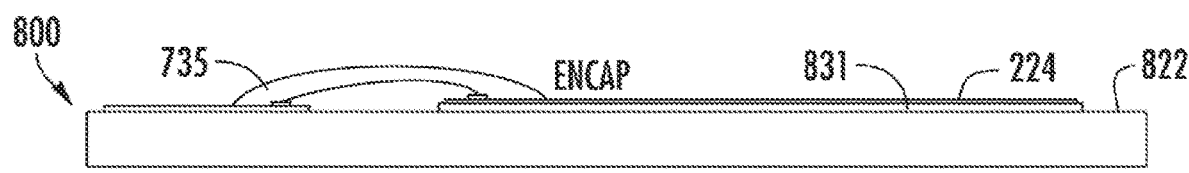
Figure 12E:
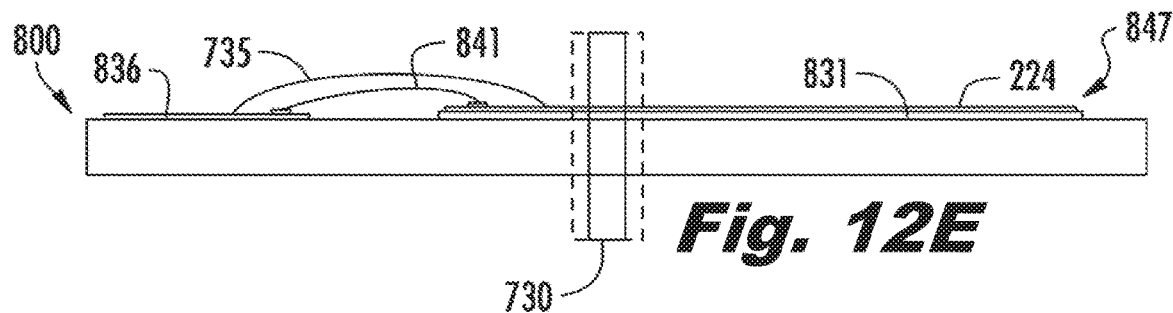

As indicated by block 906 of FIG. 10, the liquid level sensing interface (24) is wire bonded to the contact pads (836) of the carrier (822) serving as an electrical interconnect. As indicated by block 908 in FIG. 10, the wire bonds (841) shown in FIG. 12C are then encapsulated within the encapsulant (735). In one example, the encapsulant is cured. As depicted in FIG. 11, in one example, multiple sensors (800) may be formed as part of a single panel (841). For example, a single FR4 panel including electrically conductive traces and contact pads for multiple sensors (800) may be used as a substrate upon which the liquid level sensing interface (224), the drivers (728), and the encapsulant (735) may be formed. As indicated by block 910 of FIG. 10, in such an example, the individual sensors (800) are singulated from the panel. As depicted by FIG. 12E, in applications where the sensor (800) is to be incorporated as part of a liquid or fluid supply, the collar (730) is further secured to the carrier (822) between the wire bonds (841) and the lower end (847) of the liquid level sensing interface (224). In one example, the collar (730) is adhesively bonded to the carrier (822) by an adhesive that is subsequently cured.

Figure 13:
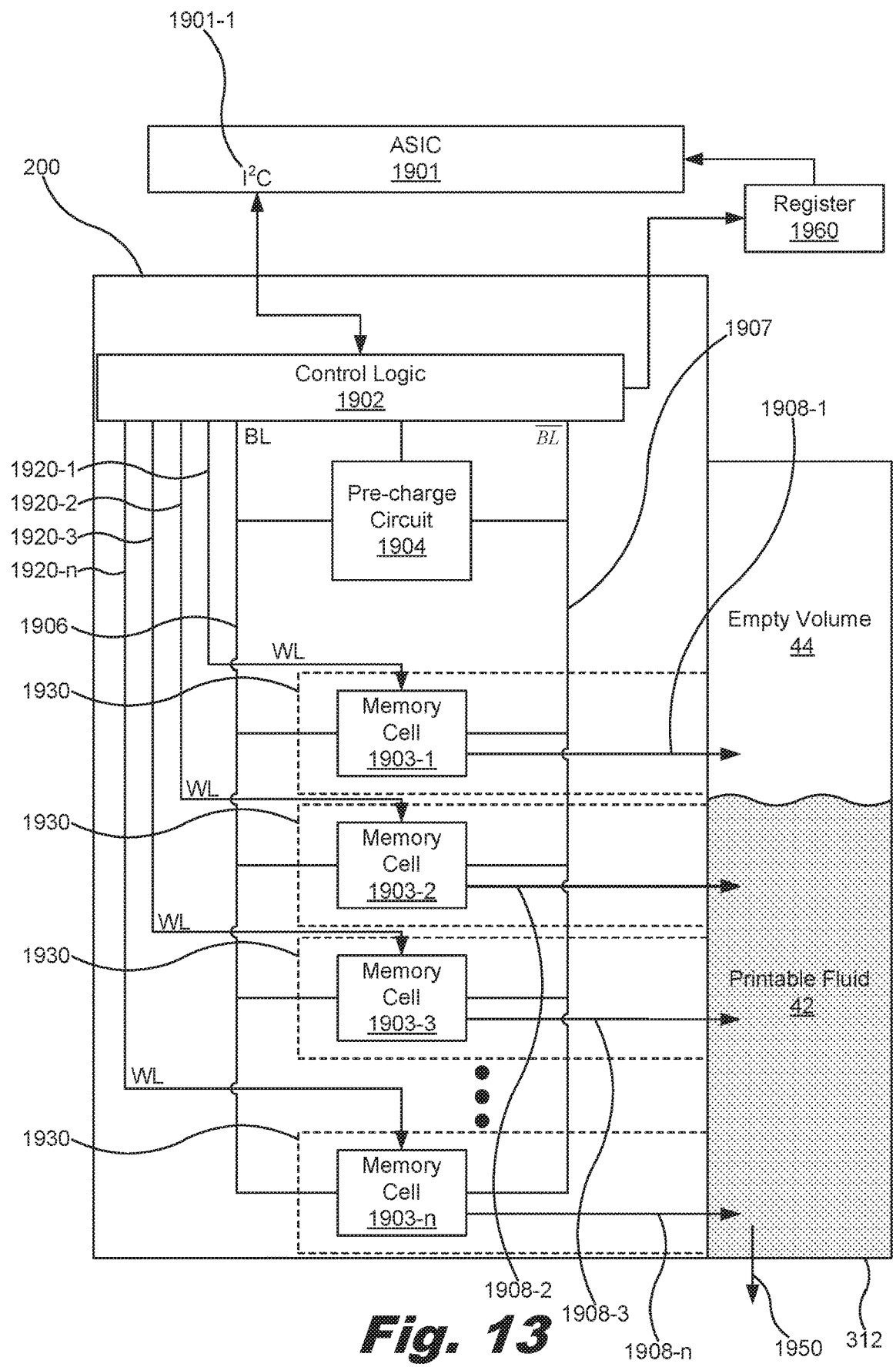
FIG. 13 is a circuit diagram of a fluid level sensor, according to one example of the principles described herein.
Figure 14:
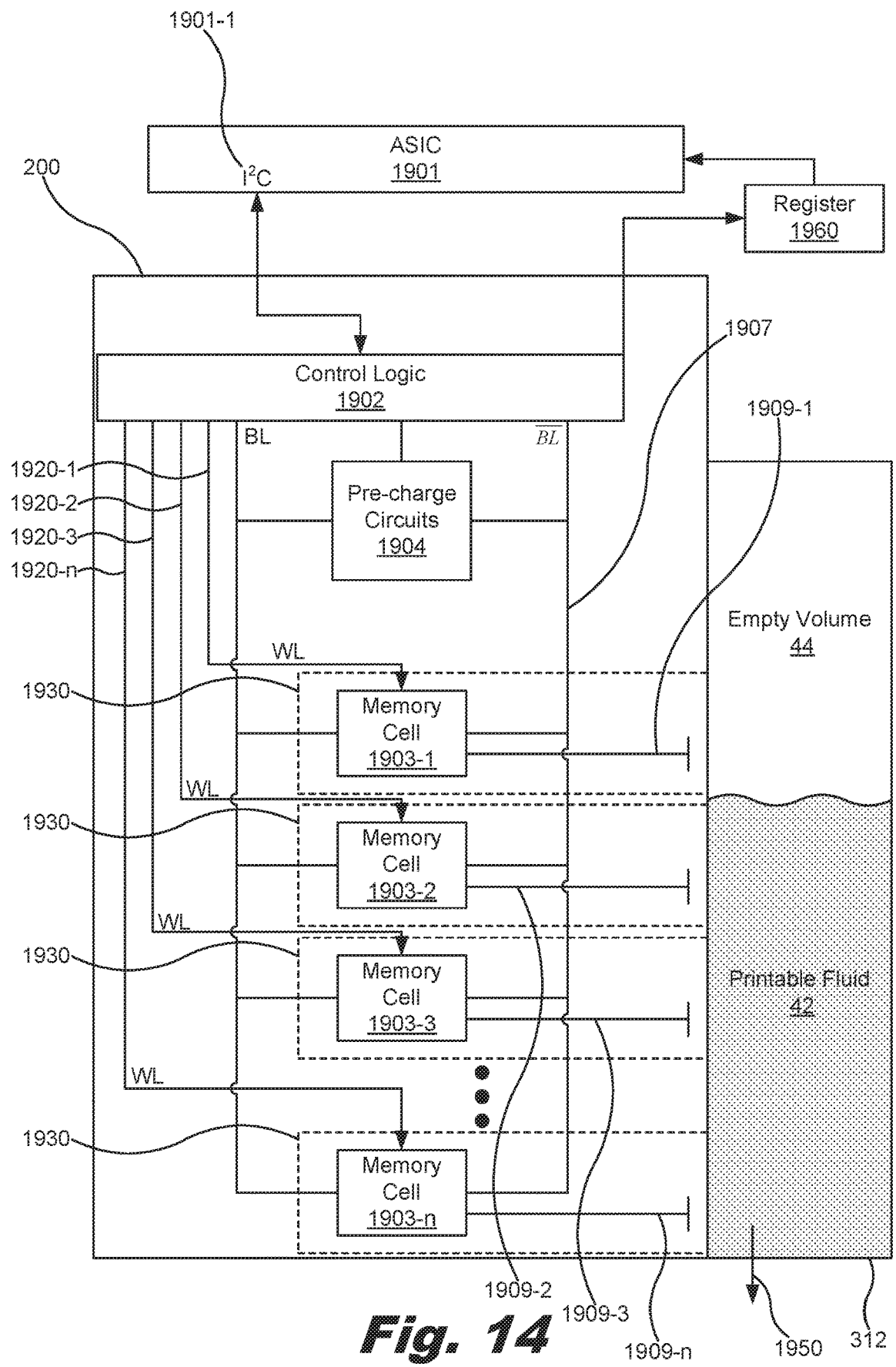
FIG. 14 is a circuit diagram of a fluid level sensor, according to another example of the principles described herein.

With the above description regarding the fluid level sensor (200), FIG. 13 is a circuit diagram of a fluid level sensor (200), according to one example of the principles described herein. FIG. 14 is a circuit diagram of a fluid level sensor (200), according to another example of the principles described herein. As will be described in more detail below, the fluid level sensor (200) of FIG. 13 utilizes conductance to detect a level of printable fluid (42) within the liquid container (312), while the fluid level sensor (200) of FIG. 14 utilizes capacitance to detect a level of printable fluid (42) within the liquid container (312). FIGS. 13 and 14 include several similar elements, and those similar elements will now be described.

The fluid level sensors (200) of FIGS. 13 and 14 may be coupled to an application specific integrated circuit (ASIC) (1901) or other processing device or combination of hardware and software that may send and receive signals to and from the fluid level sensor (200), and process the sent and received signals to obtain data regarding a sensed level of printable fluid (42) within the liquid container (312). In one example, the ASIC (1901) may communicate with control logic (1902) located on the fluid level sensor (200) using, for example, an inter-integrated circuit (I²C) command interface (1901-1) or any other type of communication interface. In one example, the ASIC (1901) may be located off of the fluid level sensor (200) and the silicon die (26). In this example, the ASIC (1901) does not take up space on the die (26) and allows the die (26) to be smaller in size. However, in another example, the ASIC (1901) and other processing devices may be located on the fluid level sensor (200) or the die (26). In one example, the ASIC (1901) may be coupled to or part of a printing device. In this example, instructions may be sent between the printing device and the ASIC (1901) to instruct the fluid level sensor (200) to function as described herein, and to relay results from the fluid level sensor (200) to the printing device.

The fluid level sensor (200) includes control logic (1902) to control the sending of a number of signals to various elements within the fluid level sensor (200). In one example, the control logic (1902) sends signals via a number of word lines (WLs) (1920-1, 1920-2, 1920-3, 1920-n). The WLs are collectively referred to herein as 1920. In one example, the control logic (1902) sends signals via a bit line (BL) (1906) and a bit line bar ($\overline{BL}$) (1907). The WLs (1920), the BL (1906) and the $\overline{BL}$ (1907) are used, in conjunction with the pre-charge circuit (1904), to pull the memory cells (1903) to a mid-point line in preparation for determining the level of the printable fluid (42) within the liquid container (312). More regarding the WLs (1920), the BL (1906) and the $\overline{BL}$ (1907) will be described below in connection with FIGS. 15 and 16

In one example, the control logic (1902) sends a select signal to a number of memory cells (1903-1, 1903-2, 1903-3, 1903-n) of the sensing locations (1930) to select at least one of the sensing locations (1930) for analyzation. The memory cells (1903-1, 1903-2, 1903-3, 1903-n) are collectively referred to as 1903. The control logic (1902) may send other types of signals as described herein. In one example, the control logic (1902) is located on the die (26). However, in another example, the control logic (1902) may be located off the die (26) in order to allow the size of the die (26) to remain small. In this example, the control logic (1902) may be located on an associated printing device along with the ASIC (1901). The fluid level sensor (200) also includes a common ground (1950).

Each of a number of sensing locations (1930) includes a memory cell (1903), and an electrical component (FIG. 13, 1908, FIG. 14, 1909). The electrical component (FIG. 13, 1908, FIG. 14, 1909) is used in connection with the memory cell (1903) to detect the level of printable fluid (42) within the liquid container (312). In one example, the memory cell (1903) is a static random access memory (SRAM) device. In another example, the memory cell (903) is a sense amplifier. FIGS. 13 and 14 include an ellipsis between the third memory cell (1903-3) and the nth memory cell (1903-n) to indicate that any number of memory cells and, correspondingly, any number of sensing locations (1930) may be included within the fluid level sensor (200). Details regarding the memory cell (1903) will be provided below in connection with FIGS. 15 and 16.

In the examples described herein, control signals are sent to the memory cells (1903) such that the memory cells (1903) are sequentially actuated, powered on, or addressed. In one example, the memory cells (1903) are sequentially actuated, powered on, or addressed, for example, in order from top to bottom along the die (26) or from bottom to top along the die (26). In another example, the memory cells (1903) are actuated, powered on, or addressed based upon a search algorithm, wherein the control logic (1902) identifies which of the memory cells (1903) should be initially actuated, powered on, or addressed in an effort to reduce the total time or the total number of memory cells (1903) that are actuated, powered on, or addressed to determine the level of liquid (42) within volume (FIG. 3, 40). In one example, the identification of what memory cells (1903) are initially actuated, powered on, or addressed is based upon historical data. For example, in one example, the control logic (1902) consults a memory to obtain data regarding the last sensed level of liquid (42) within the volume (40) and actuates, powers on, or addresses those memory cells (1903) most proximate to the last sensed level of the liquid (42) before actuating, powering on, or addressing other heating elements (30) more distant from the last sensed level of the liquid (42).

In another example, the control logic (42) predicts the current level of the liquid (42) within the volume (40) based upon the obtained last sensed level of the liquid (42) and actuates, powers on, or addresses those memory cells (1903) proximate to the predicted current level of the liquid (42) within the volume (40) actuating, powering on, or addressing other memory cells (1903) more distant from the predicted current level of the liquid (42). In one example, the predicted current level of the liquid (42) is based upon the last sensed level of the liquid (42) and a lapse of time since the last sensing of the level of the liquid (42). In another example, the predicted current level of the liquid (42) is based upon the last sensed level of the liquid (42) and data indicating the consumption or withdrawal of the liquid (42) from the volume (40). For example, in circumstances where the liquid interface (42) is sensing the volume (40) of an ink in an ink supply, the predicted current level of liquid (42) may be based upon a last sensed level of the liquid (42) and data such as the number of pages printed using the ink or the like.

In yet another example, the memory cells (1903) may be sequentially actuated, powered on, or addressed, wherein the memory cells (1903) proximate to a center of the depth range of volume (40) are initially actuated, powered on, or addressed and wherein the other memory cells (1903) are actuated, powered on, or addressed in the order based upon their distance from the center of the depth range of volume (40). In yet another example, subsets of memory cells (1903) are concurrently actuated, powered on, or addressed. For example, a first memory cell (1903) and a second memory cell (1903) may be concurrently actuated, powered on, or addressed. Concurrently actuating, powering on, or addressing memory cells (1903) may reduce the total time for determining the level of the liquid (42) within the volume (40).

The control logic (1902) or ASIC (1901) determines a level of the liquid (42) within the volume (40) based upon the sensed conductance or capacitance from each memory cell (1903). For example, the liquid (42) has a higher conductance and capacitance than air (44). Thus, the liquid (34) may have electrical properties detected by the memory cells (1903) differently with respect to the air (44). If the level of the liquid (42) within the volume (40) is such that liquid is at a level between a first memory cell (1903) and a second memory cell (1903), conductance or capacitance sensed by the first memory cell (1903) and a second memory cell (1903) will be different. This indicates that the electrical properties where air (44) is present is different from that with relation to liquid (42). Based upon the electrical properties sensed by the memory cells (1903), the ASIC (1901) or control logic (1902) determines whether air or liquid is present at a sensing location (1930) where the memory cell (1903) is present. Using this determination and the known location of the sensing location (1930) along the die (26) and the relative positioning of the die (26) with respect to the floor of the volume (40), the ASIC (1901) or control logic (1902) determines the level of the liquid (42) within the volume (40). Based upon the determined level of the liquid (42) within the volume (40) and the characteristics of the volume (40), the controller is further able to determine the actual volume or amount of liquid remaining within the volume (40).

In one example, the ASIC (1901) or control logic (1902) determines the level of liquid within the volume (40) by consulting a lookup table stored in a memory, wherein the lookup table associates different signals from the memory cells (1903) with different levels of liquid within the volume (40). In yet another example, the controller determines the level of the liquid (42) within the volume (40) by utilizing signals from the memory cells (1903) as input to an algorithm or formula.

In some examples described herein, the fluid level sensor (200) may be used to not only determine an uppermost level or top surface of the liquid (42) within the volume (40), but also to determine different levels of different liquids concurrently residing in the volume (40). For example, due to different densities or other properties, different liquids may layer upon one another while concurrently residing in a single volume (40). Each of such different liquids may have a different conductance or capacitance characteristics. In such an application, the fluid level sensor (200) may be used to identify where the layer of a first liquid ends within volume (40) and where the layer of a second different liquid, underlying or overlying the first liquid, begins.

In one example, the determined level (or levels) of liquid within the volume (40) and/or the determined volume or amount of liquid within volume (40) is output through a display or audible device. In yet other examples, the determined level of liquid or the volume of liquid is used as a basis for triggering an alert or warning to a user. In some examples, the determined level of liquid or volume of liquid is used to trigger the automatic reordering of replenishment liquid or the closing of a valve to stop the inflow of liquid into the volume (40). For example, in printers, the determined level of liquid within volume (40) may automatically trigger reordering of the replacement ink cartridge or replacement ink supply.

In FIG. 13, the electrical component (1908, 1909) includes a number of electrodes (1908-1, 1908-2, 1908-3, 1908-*n*) exposed to the interior of the liquid container (312), and coming into physical contact with either the printable fluid (42) or the empty space (44) within the liquid container (312) based on the location of the sensing locations (1930) and the level of the printable fluid (42) within the liquid container (312). The electrodes (1908-1, 1908-2, 1908-3, 1908-*n*) of FIG. 13 are collectively referred to herein as 1902. The electrodes (1908) may be metallic pins, traces of metal, wires, other conductive elements, or combinations thereof. The electrodes (1908) complete an electrical circuit when printable fluid (42) within the liquid container (312) is detected.

In FIG. 14, the electrical component (1908, 1909) includes a number of capacitors (1909-1, 1909-2, 1909-3, 1909-*n*). The capacitors (1909-1, 1909-2, 1909-3, 1909-*n*) of FIG. 14 are collectively referred to herein as 1909. In the example of FIG. 14, a first terminal or plate of each of the capacitors (1909) is coupled to the memory cells (1903). In one example of FIG. 14, a second plate of the capacitors (1909) is exposed to the printable fluid (42) and empty space (44) of the liquid container (312). In this example, the second plate of each of the capacitors (1909) is in direct contact with the printable fluid (42) or empty space (44) of the liquid container (312).

In another example of FIG. 14, a second plate of each of the capacitors (1909) are not exposed to the printable fluid

(42) and empty space (44) of the liquid container (312). In this example, the printable fluid (42) and empty space (44) themselves act as the second terminal, and a passivation layer is interposed between the first terminal of the capacitors (1909) and the printable fluid (42) and empty space (44). In this manner, reliability of the system is improved since the printable fluid (42) does not come into contact with an electrical component (1908, 1909) of the sensing locations (1930). Also, the printable fluid (42) cannot be contaminated by oxidation or other chemical reactions that may occur between an electrical component (1908, 1909) in direct contact with the printable fluid (42). In this example, the permittivity of the empty space (44) (i.e., air) versus the printable fluid (42) is used to determine whether the printable fluid (42) is or is not present next to a given sensing location (1930). Here, permittivity may be defined as the ability of a substance to store electrical energy in an electric field.

In either of the above examples of FIG. 14, the first plate of the capacitors (1909) is capacitatively coupled to the printable fluid (42) and empty space (44) of the liquid container (312). The capacitors (1909) experience either high or low capacitance based on whether the printable fluid (42) or the empty space (44) is present at the respective sensing locations (1930).

Turning again to FIGS. 13 and 14, the fluid level sensor (200) also includes a pre-charge circuit (1904). In one example, the pre-charge circuit (1904) applies pre-charge a ½ $V_{DD}$ voltage to the BL (1906) and a $\overline{BL}$ (1907) in order to pull the pull the memory cells (1903) to a mid-point line in preparation for determining the level of the printable fluid (42) within the liquid container (312). The pre-charge circuit (1904) will be described in more detail in connection with FIG. 17.

In one example, a register (1960) may be included with the ASIC (1901) and the fluid level sensor (200). The register (1960) receives a state of the memory cells (1903) from the control logic (1902) that indicates the level of the printable fluid (42) within the liquid container (312). This data may be used by the ASIC (1901) in processing, may be transmitted to a connected printing device, or used in any manner. In one example, the register (1960) is a separate device with respect to the ASIC (1901) and the fluid level sensor (200). In another example, the register (1960) is located on the fluid level sensor (200). In still another example, the register (1960) is located on the ASIC (1901) or on electronics of the printing device. In yet another example, instead of the register (1960), state of the memory cells (1903) from the control logic (1902) that indicates the level of the printable fluid (42) may remain in the memory cells (1903), so long as the memory cells (1903) remain powered, and read out at a later time when, for example, all of the memory cells (1903) have evaluated the presence or lack of the printable fluid (42) at their respective sensing locations (1930).

With reference to FIGS. 13 and 14, the memory cells, being well balanced, powers up in a random one of two states; a first state that may be indicated by a "0," and a second state that may be indicated by a "1." In the examples herein, the zero "0" state may indicate the lack of the printable fluid (42) next to a sensing location that indicated such as state. Likewise, the one "1" state may indicate the presence of the printable fluid (42) next to a sensing location that indicated such as state. In one example, the control logic (1902) and the pre-charge circuit (1904) may cause one or more of the memory cells (1903) to be slightly unbalanced such that when it is powered up, it powers up in, for example, the zero ("0") state. The electrical component (1908, 1909), if in electrical contact, conductively or capacitatively, with the printable fluid (42) will, however, cause the associated memory cell (1903) to power up in a different state such as a "1" indicating the presence of the printable fluid (42) at that sensing location (1930).

In one example, all of the memory cells (1903) may be powered up at the same time. In this example, the way in which the memory cells (1903) fall indicates the presence (i.e., "1") or lack of (i.e., "0") printable fluid (42) at that given sensing location (1930). Where the memory cells (1903) of the array of sensing locations (1930) switch from "0" to "1" or visa versa along the length of the fluid level sensor (200), that location is identified by the ASIC (1901) or other processing device as where the level of the printable fluid (42) is located.

In another example, the memory cells (1903) may be addressed by the control logic (1902), the ASIC (1901), or other processing device using the WLs (1920). In this example, the memory cells (1903) may be powered up based on the addressing by the control logic (1902). This ability of the control logic (1902), the ASIC (1901), or other processing device to individually address the memory cells (1903) provides for the ability to randomly address the memory cells (1903) of the sensing locations (1930) as opposed to serially actuate the memory cells (1903) as is performed in, for example, a system that uses a shift register. This, in turn, provides for the ability to randomize and obscure measurement data obtained from the fluid level sensor (200).

Figure 15:
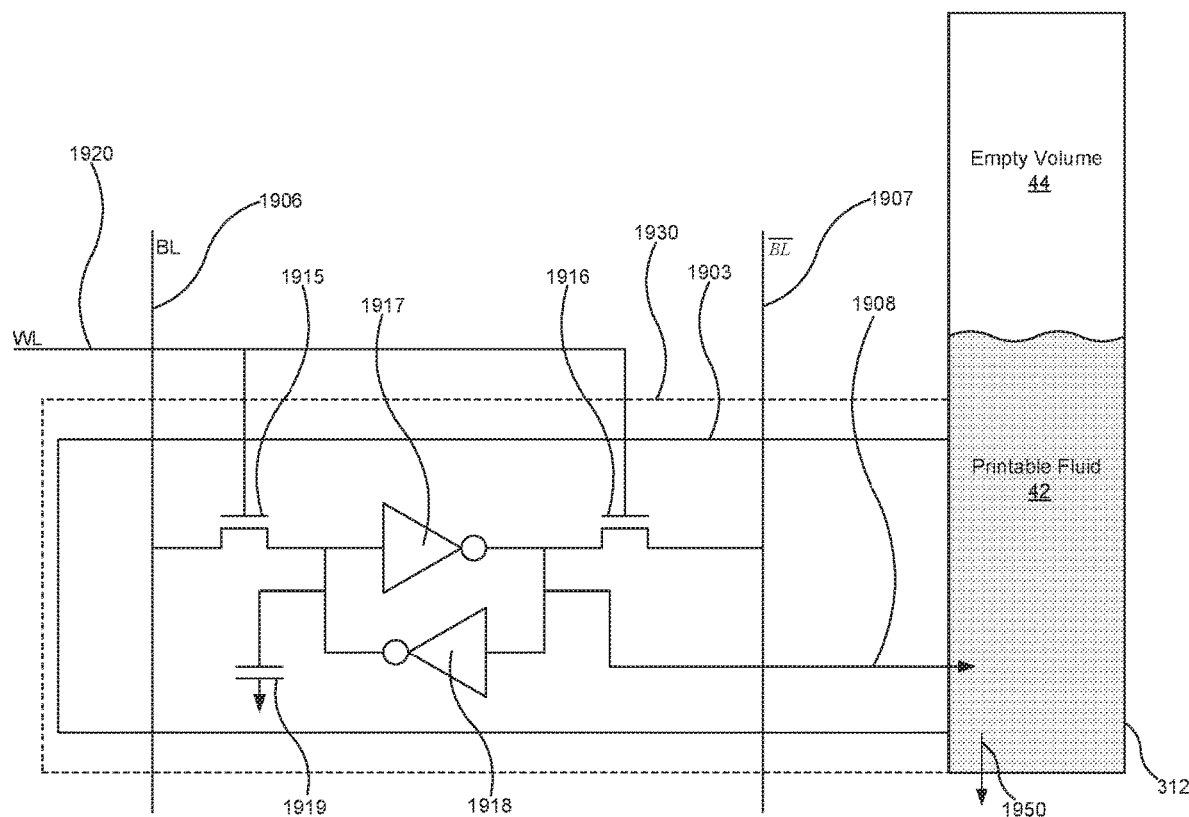
FIG. 15 is a circuit diagram of a memory cell of a sensing location of the fluid level sensor of FIG. 13, according to one example of the principles described herein.
Figure 16:
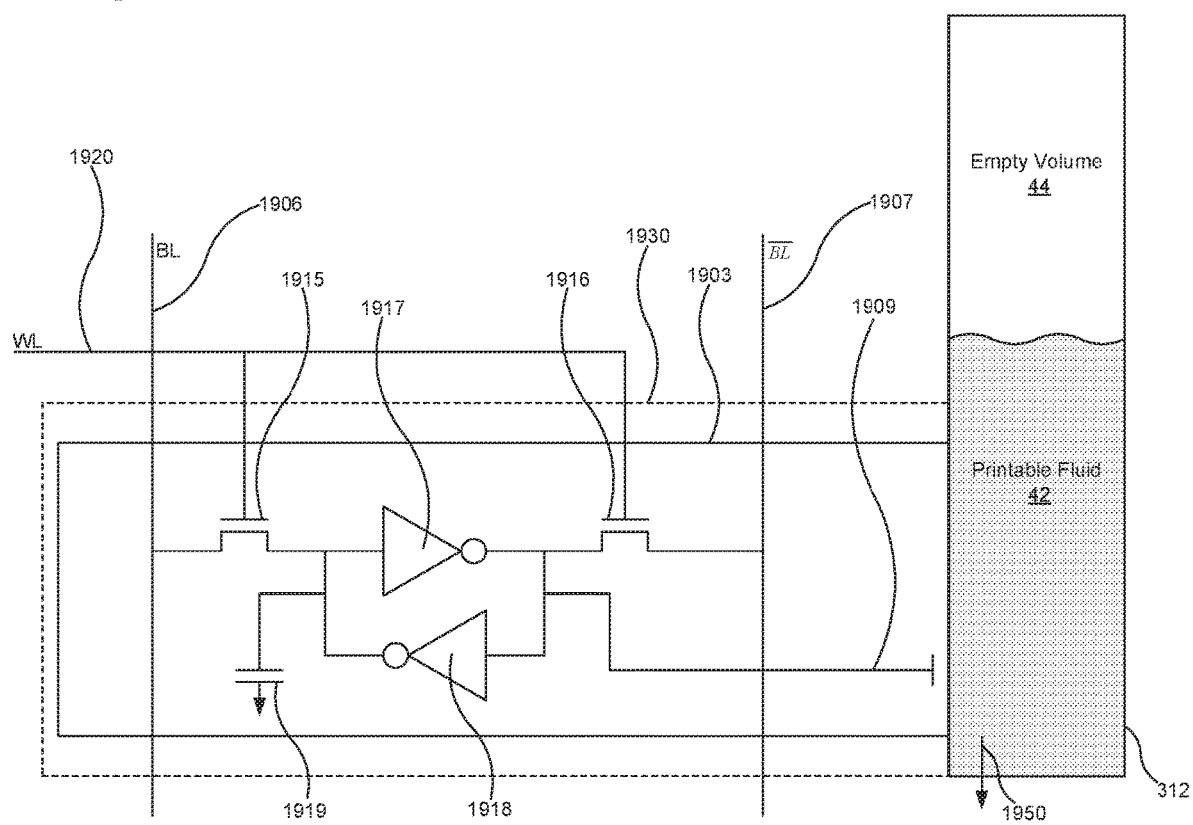
FIG. 16 is a circuit diagram of a memory cell of a sensing location of the fluid level sensor of FIG. 14, according to one example of the principles described herein.

Turning now to FIGS. 15 and 16, FIG. 15 is a circuit diagram of a memory cell (1930) of a sensing location (1930) of the fluid level sensor (200) of FIG. 13, according to one example of the principles described herein. FIG. 16 is a circuit diagram of a memory cell (1903) of a sensing location (1930) of the fluid level sensor (200) of FIG. 14, according to one example of the principles described herein. The example of FIG. 15 utilizes conductivity in connection with the detection of the level of the printable fluid (42) as described above in connection with FIG. 13. The example of FIG. 16 utilizes capacitance in connection with the detection of the level of the printable fluid (42) as described above in connection with FIG. 14.

The memory cell (1903) of the sensing location (1930) includes a first field-effect transistor (FET) (1915) and a second FET (1916). The first FET (1915) is coupled to the BL (1906) and the WL (1920). The second FET is coupled to the $\overline{BL}$ (1907) and the WL (1920). Both the first FET (1915) and the second FET (1916) are also coupled to a pair of cross-coupled inverters (1917, 1918). The inverters (1917, 1918) may be any logical gate that implements logical negation such that the inverter outputs a voltage representing the opposite logic-level to its input. The inverters (1917, 1918) comprise, for example, an n-type metal-oxide-semiconductor (NMOS) device, a p-type MOS (PMOS) device coupled to a resistor, a complimentary MOS (CMOS) device, or other transistor-based devices. In one example, the FETs (1915, 1916) are n-type FETs. However, the FETs (1915, 1916) may be any type of transistor device.

As depicted in FIGS. 15 and 16, the first FET (1915) is coupled to an input of the first inverter (1917), and is coupled to the output of the second inverter (1918). The second FET (1916) is coupled to an input of the second inverter (1918), and is coupled to the output of the first inverter (1917). On the side of the cross-coupled inverters (1917, 1918) where the first FET (1915) is located, a bias capacitor (1919) is coupled to the input of the first inverter (1917) and the output of the second inverter (1918).

In the case of FIG. 15, an electrode (1908) is coupled to the input of the second inverter (1918) and the output of the first inverter (1917), on the side of the cross-coupled inverters (1917, 1918) where the second FET (1916) is located. The electrode (1908) is exposed to the interior of the liquid container (312), and physically contacts either the printable fluid (42) or the empty space (44) within the liquid container (312) based on the location of the sensing locations (1930) and the level of the printable fluid (42) within the liquid container (312). When the memory cell (1903) is left to fall, settle, or switch to one state ("0") or another ("1") based on the conductance of the bias capacitor (1919) and the conductance of the printable fluid (42) or empty space (44) (e.g., air) as sensed through the electrode (1908), the bias capacitor (1919) pulls the memory cell (1903) in one direction and the bias provided through the electrode (1908) pulls the memory cell (1903) in the opposite direction. In one example, if the conductance through the electrode (1908) is greater than the conductance of the bias capacitor (1919), then this may indicate that the electrode (1908) is in contact with the printable fluid (42) and the level of the printable fluid is at least as high as that respective sensing location (1930). If, however, the conductance through the electrode (1908) is less than the conductance of the bias capacitor (1919), then this may indicate that the electrode (1908) is in contact with the empty space (44) and the level of the printable fluid is below that respective sensing location (1930).

In the case of FIG. 16, a capacitor (1909) is capacitatively coupled to the input of the second inverter (1918) and the output of the first inverter (1917), on the side of the cross-coupled inverters (1917, 1918) where the second FET (1916) is located. The capacitor (1909) obtains a level of capacitance from its capacitive contact with either the printable fluid (42) or the empty space (44) within the liquid container (312) based on the location of the sensing locations (1930) and the level of the printable fluid (42) within the liquid container (312). When the memory cell (1903) is left to fall, settle, or switch to one state ("0") or another ("1") based on the capacitance of the bias capacitor (1919) and the capacitance of the printable fluid (42) or empty space (44) (e.g., air) as sensed through the capacitor (1909), the bias capacitor (1919) pulls the memory cell (1903) in one direction and the bias provided through the capacitor (1909) pulls the memory cell (1903) in the opposite direction. In one example, if the capacitance of the capacitor (1909) is greater than the capacitance of the bias capacitor (1919), then this may indicate that the capacitor (1909) is in capacitative contact with the printable fluid (42) and the level of the printable fluid is at least as high as that respective sensing location (1930). If, however, the capacitance of the capacitor (1909) is less than the capacitance of the bias capacitor (1919), then this may indicate that the capacitor (1909) is in capacitative contact with the empty space (44) and the level of the printable fluid is below that respective sensing location (1930).

Figure 17:
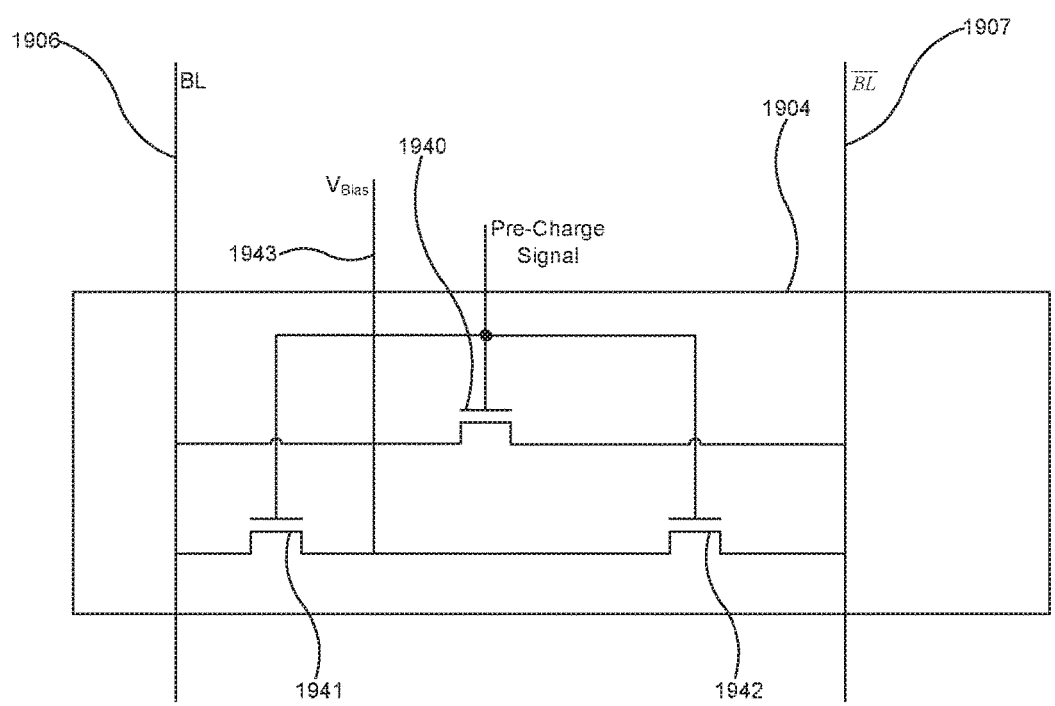
FIG. 17 is a circuit diagram of a pre-charge circuit of a fluid level sensor, according to one example of the principles described herein.

FIG. 17 is a circuit diagram of a pre-charge circuit (1904) of a fluid level sensor (200), according to one example of the principles described herein. The pre-charge circuit (1904) includes a shorting FET (1940) coupled to the BL (1906) and the $\overline{BL}$ (1907), with the third terminal receiving a pre-charge voltage. The pre-charge voltage is also provided to a first pre-charge FET (1941) and a second pre-charge FET (1942). A ½ $V_{DD}$ voltage, indicated as $V_{Bias}$, is provided to the pre-charge circuit (1904) via a source line (1943) coupled between the first pre-charge FET (1941) and the second pre-charge FET (1942).

The shorting FET (1940) may be any shorting transistor device including, for example, a metal-oxide semiconductor FET (MOSFET), a switch, a line balancer, or other device that causes the voltage at the first pre-charge FET (1941) and the second pre-charge FET (1942) to balance. The first pre-charge FET (1941) and the second pre-charge FET (1942) may be any type of transistor device including, for example, an n-type FET, a p-type FET, or other types of transistor devices.

The three FETs (1940, 1941, 1942) are enabled by the pre-charge signal. When the pre-charge signal is applied, a ½ $V_{DD}$ voltage, indicated as $V_{Bias}$ in FIG. 17, is applied to the BL (1906) and the $\overline{BL}$ (1907), and both the BL (1906) and the $\overline{BL}$ (1907) are shorted to each other via the shorting FET (1940) to ensure that the BL (1906) and the $\overline{BL}$ (1907) are balanced. Thus, the pre-charging circuit (1904) forces the BL (1906) and the $\overline{BL}$ (1907) to be perfectly balanced at ½ $V_{DD}$ voltage. Because the pre-charging circuit (1904) balances the BL (1906) and the $\overline{BL}$ (1907), the memory cells (1903) are each balanced as well since they are each coupled to the BL (1906) and the $\overline{BL}$ (1907) as well.

Figure 18:
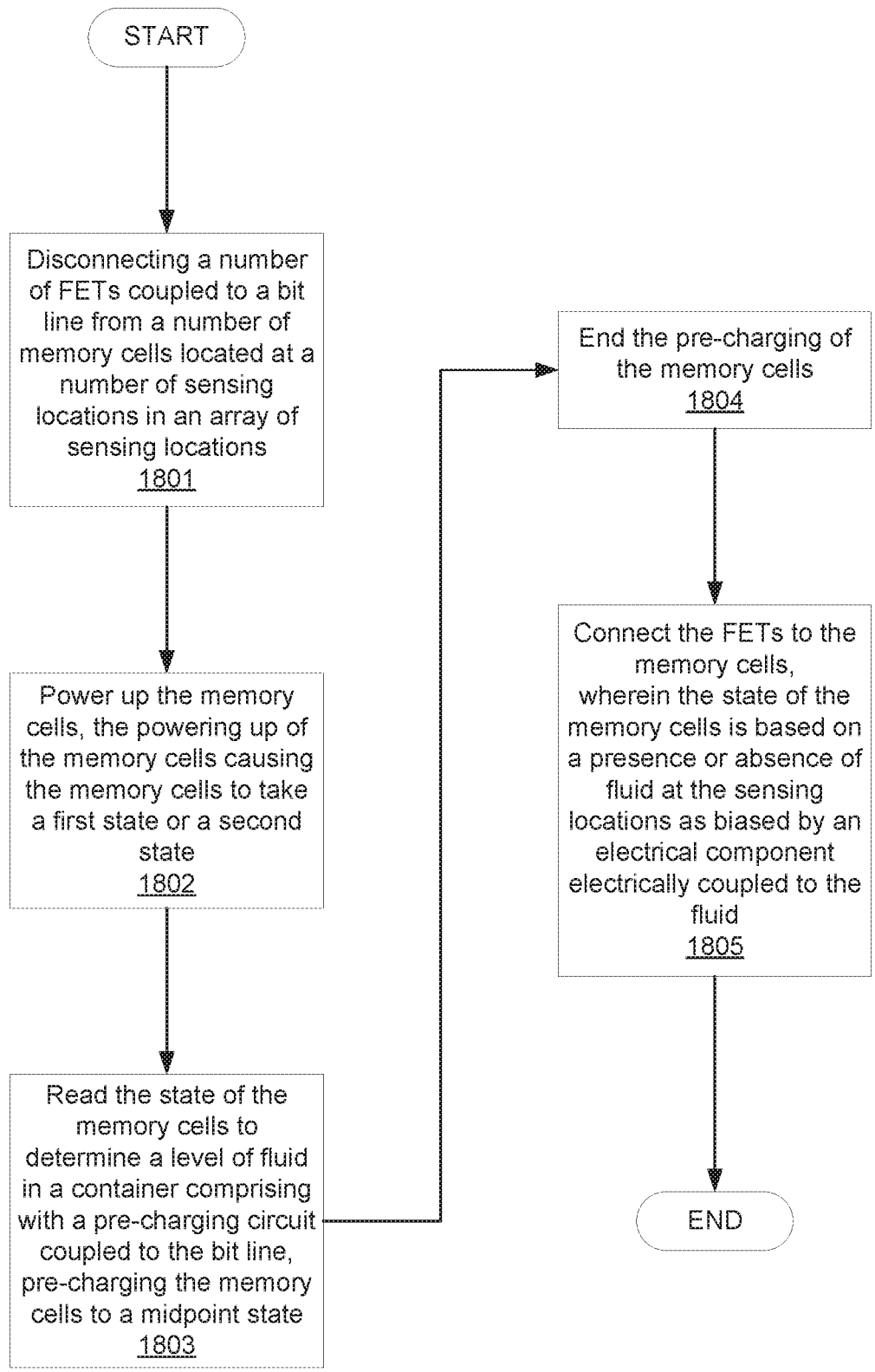
FIG. 18 is a flowchart showing a method of detecting a level of fluid in a container, according to one example of the principles described herein.

FIG. 18 is a flowchart showing a method of detecting a level of printable fluid (42) in a liquid container (312), according to one example of the principles described herein. The method of FIG. 18 may begin by disconnecting (block 1801) a number of FETs (1915, 1916) coupled to a bit line (1906) from a number of memory cells (1903) located at a number of sensing locations (1930) in an array of sensing locations (1930). The disconnecting (block 1801) of the FETs (1915, 1916) isolates the cell from the BL (1906) and the $\overline{BL}$ (1907). The memory cells (1903) are powered up (block 1802). The powering up of the memory cells (1903) causes the memory cells (1903) to take a first state (i.e., "0") or a second state (i.e., "1").

The method may continue by reading the state of the memory cells (1903) to determine a level of printable fluid (42) in a liquid container (312). Reading the state of the memory cells (1903) may include, with a pre-charging circuit (1904) coupled to the bit line (1906, 1907), pre-charging (block 1803) the memory cells (1903) to a midpoint or balanced state. The pre-charging of the memory cells (1803) is ended (block 1804), and the FETs (1915, 1916) are connected (block 1805) to the memory cells (1903). The state of the memory cells (1903) are read through the FETs (1915, 1916), and is based on a presence or absence of printable fluid (42) at the sensing locations (1930) as biased by an electrical component (1908, 1909) such as the above-described electrode (1908) and capacitor (1909) electrically coupled to the printable fluid (42). In one example, the powering up (block of the memory cells to cause the memory cells to take a first state or a second state is based on a bias applied to the memory cell from a first capacitor and an electrical component coupled to the memory cell.

Figure 19:
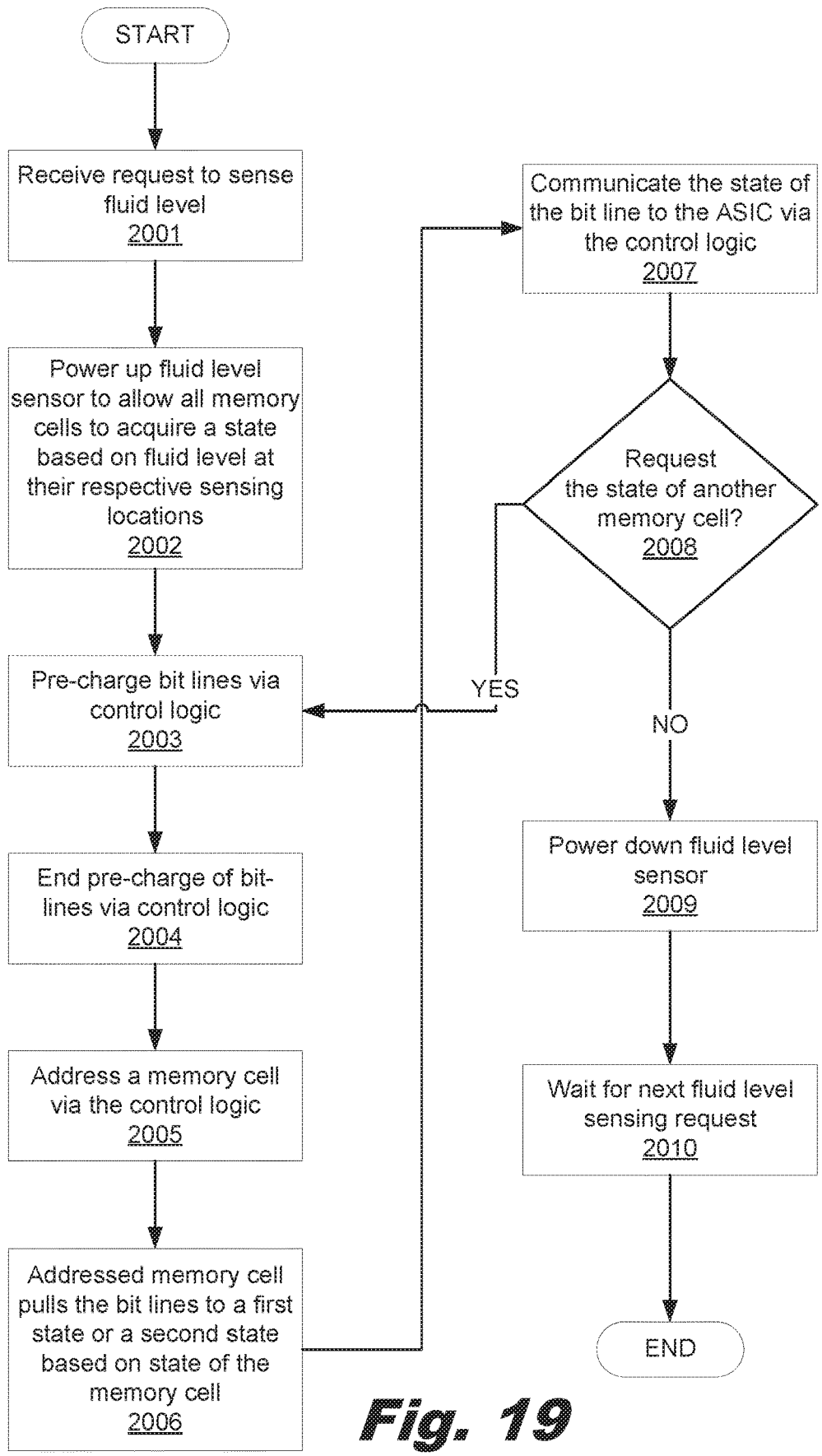
FIG. 19 is a flowchart showing a method of detecting a level of fluid in a container, according to another example of the principles described herein.

FIG. 19 is a flowchart showing a method of detecting a level of printable fluid (42) in a liquid container (312), according to another example of the principles described herein. The method of FIG. 19 provides for the acquisition of a state of the memory cells (1903) on power up of the fluid level sensor (200). The method of FIG. 19 may begin by receiving (block 2001) a request to sense a level of printable fluid (42) within the liquid container (312). The request may originate from a printing device, the ASIC (1901), the control logic (1902), or other processing device. The control logic (1902) sends a signal to the memory cells (1903) to power up (block 2002), and instructs the pre-charge circuit (1904) to pre-charge (block 2003) the BL (1906) and the $\overline{BL}$ (1907). The ASIC (1901), the control logic (1902), or other processing device powers up (block 2002) the fluid level sensor (200) to allow all the memory cells (1903) to acquire a state based on a level of printable fluid (42) at their respective sensing locations (1930).

The control logic (1902) instructs the pre-charge circuit (1904) to pre-charge (block 2003) the BL (1906) and the $\overline{BL}$ (1907), and end (block 2004). The control logic (1902) addresses (block 2005) a first memory cell (1903) using the WL (1920). The addressed memory cell (1903) pulls (block 2006) the BL (1906) and the $\overline{BL}$ (1907) to a first state of a second state based on the state of the memory cell (1903) upon power up.

The state of the BL (1906) and the $\overline{BL}$ (1907) is communicated (block 2007) to the ASIC (1901) via the control logic (1902). In one example, the state of the BL (1906) and the $\overline{BL}$ (1907) may be stored in the register (1960). The ASIC (1901) or other processing device determines (block 2008) if the state of a subsequent memory cell (1903) is to be requested. If the state of a subsequent memory cell (1903) is not to be requested (block 2008, determination NO) due to, for example, the last memory cell (1903) having been addressed, the fluid level sensor (200) is powered down (block 2009), and the fluid level sensor (200) waits (2009) for the next fluid level sensing request.

If, however, the state of a subsequent memory cell (1903) is to be requested (block 2008, determination YES), then the method of FIG. 19 may loop back to block 2003 to pre-charge the BL (1906) and the $\overline{BL}$ (1907) in preparation for addressing (block 2005) a subsequent memory cell (1903). The method of FIG. 19 allows for the state of the memory cells (1903) to be determined faster by not performing a pre-charge of the BL (1906) and the $\overline{BL}$ (1907) twice previous to addressing (block 2005) the memory cells (1903), but, instead, allowing all the memory cells (1903) to acquire a state based on a level of printable fluid (42) at their respective sensing locations (1930) without application of the pre-charge.

Figure 20:
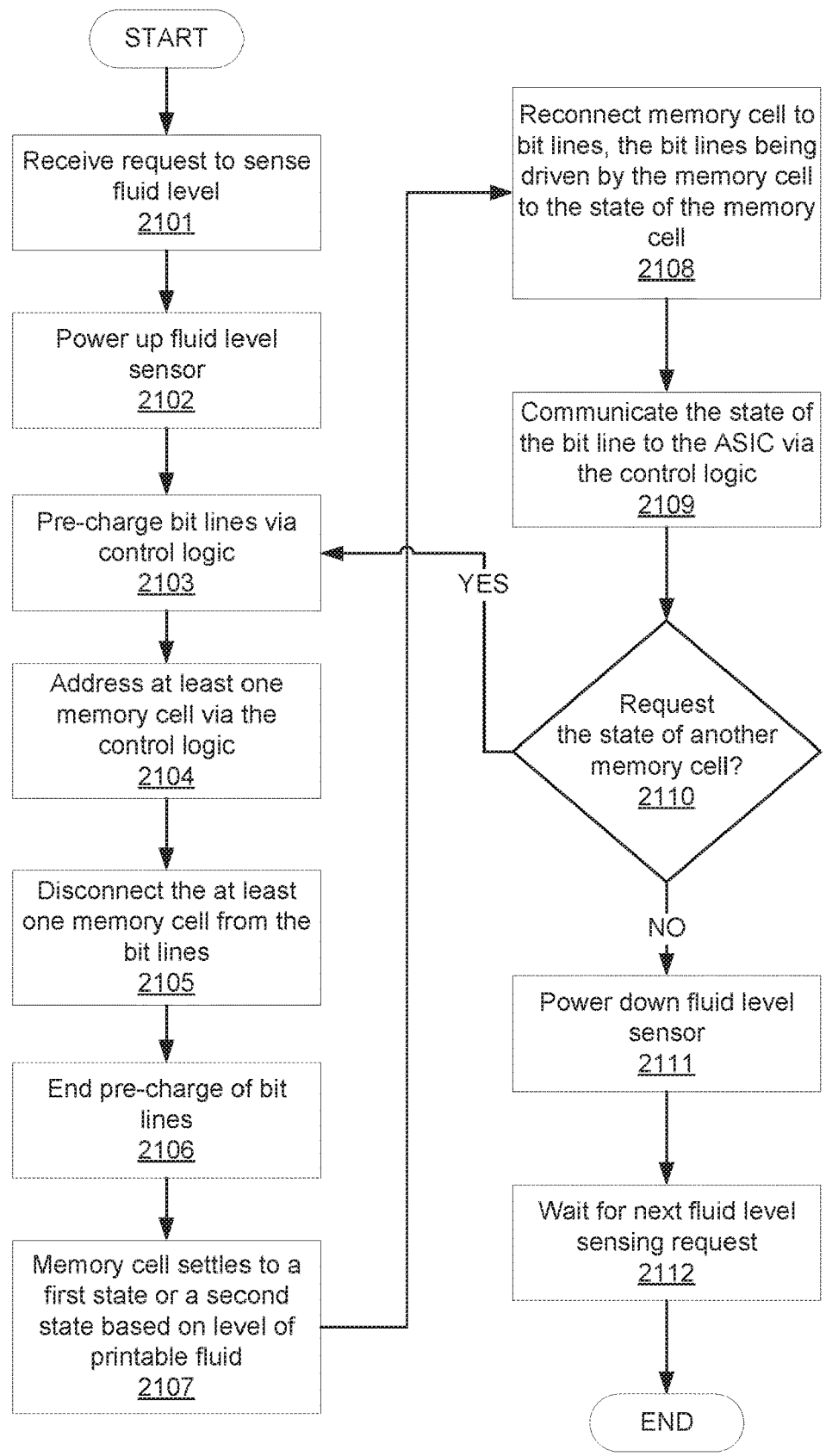
FIG. 20 is a flowchart showing a method of detecting a level of fluid in a container using conduction, according to another example of the principles described herein.

FIG. 20 is a flowchart showing a method of detecting a level of fluid in a container using conductance, according to another example of the principles described herein. The method of FIG. 20 provides for the acquisition of a state of the memory cells (1903) after power up of the fluid level sensor (200) and a pre-charge applied to the BL (1906) and the $\overline{BL}$ (1907). The method of FIG. 20 may begin by receiving (block 2101) a request to sense a level of printable fluid (42) within the liquid container (312). The control logic (1902) sends a signal to power up (block 2102) the fluid level sensor (200), and instructs the pre-charge circuit (1904) to pre-charge (block 2103) the BL (1906) and the $\overline{BL}$ (1907). The control logic (1902) pre-charges (block 2103) the BL (1906) and the $\overline{BL}$ (1907) in order to bring the memory cells (1903) to a balanced state in preparation for acquiring a state of the memory cells (1903). Thus, the control logic (1902) instructs the pre-charge circuit (1904) to pre-charge (block 2103) the BL (1906) and the $\overline{BL}$ (1907), and addresses (block 2104) at least one memory cell (1903) using the WL (1920).

At least one memory cell (1903) is addressed (block 2104) by the control logic (1902) using the WL (1920). In one example, the memory cells (1903) are addressed in series wherein the method of FIG. 20 is performed for each of the memory cells (1903) within the die (26). In another example, a plurality of memory cells (1903) within the die (26) are simultaneously addressed. In this example, the pre-charging (block 2103) occurs once, the plurality of addressed memory cells (1903) are allowed to shift, and the data from each of the plurality of addressed memory cells (1903) are shifted out or read individually. In still another example, all the memory cells (1903) within the die (26) are simultaneously addressed.

The method of FIG. 20 may continue by disconnecting (block 2105) the at least one memory cell (1903), and ending (block 2106) the pre-charge of the BL (1906) and the $\overline{BL}$ (1907). The memory cells (1903) settle (block 2107) to a first state or a second state based on the level of printable fluid (42) located at their respective sensing locations (1930).

The control logic (1902) reconnects (block 2108) the memory cell (1903) to the BL (1906) and the $\overline{BL}$ (1907) which causes the BL (1906) and the $\overline{BL}$ (1907) to be driven by the memory cell (1903) to the state of the memory cell (1903). The state of the BL (1906) and the $\overline{BL}$ (1907) is communicated (block 2109) to the ASIC (1901) via the control logic (1902). In one example, the state of the BL (1906) and the $\overline{BL}$ (1907) may be stored in the register (1960). The ASIC (1901) or other processing device determines (block 2110) if the state of a subsequent memory cell (1903) is to be requested. If the state of a subsequent memory cell (1903) is not to be requested (block 2110, determination NO) due to, for example, the last memory cell (1903) having been addressed, the fluid level sensor (200) is powered down (block 2111), and the fluid level sensor (200) waits (2112) for the next fluid level sensing request.

If, however, the state of a subsequent memory cell (1903) is to be requested (block 2110, determination YES), then the method of FIG. 20 may loop back to block 2103 to pre-charge the BL (1906) and the $\overline{BL}$ (1907) in preparation for addressing (block 2104) a subsequent memory cell (1903). The method of FIG. 20 allows for the state of the memory cells (1903) to be determined based on a pre-charge of the BL (1906) and the $\overline{BL}$ (1907) that balances the BL (1906) and the $\overline{BL}$ (1907) and, in turn, the memory cells (1903) previous to addressing (block 2005) the memory cells (1903). This allows all the memory cells (1903) to acquire a state based on a level of printable fluid (42) at their respective sensing locations (1930) with application of the pre-charge provided via the pre-charge circuit (1904) that perfectly balances the memory cells (1903) before acquisition of their respective states.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the ASIC (1901), the control logic (1902), or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a fluid level sensor includes control logic, and an array of sensing locations to detect a level of fluid in a container. The array of sensing locations include a number of memory cells located at a number of sensing locations in the array of sensing locations, a word line coupled to the memory cells, a bit line coupled to the memory cells, and a pre-charge circuit coupled to the word line and the bit line. The control logic instructs a number of field effect transistors (FETs) coupled to a bit line to disconnect from a number of the memory cells. The control logic powers up the memory cells. The powering up of the memory cells causes the memory cells to take a first state or a second state. The control logic outputs the state of the memory cells to a processing device. The state of the memory cells defines the level of the fluid in the container.

The examples described herein save printhead manufacturing costs by providing a simple method for capturing and communicating ink levels. Further, the examples described herein provides for the ability to randomly address ink level sense elements and provides for randomization and obscuring of measurement data. Further, pre-charge balancing of the bit-lines ensures reliable evaluation of a fluid level state at the memory devices and assures a balanced starting state. Further, examples described herein allows for repeated measurements without requiring a power-down/power-up cycle. Still further, in the case of the capacitance example described above, the examples described herein do not require conduction into the printable fluid (42), and, therefore, avoids issues related to degradation of electrical components and contamination of the printable fluid (42).

The preceding description has been presented to illustrate and describe examples of the principles described. This description is not intended to be exhaustive or to limit these principles to any precise form disclosed. Many modifications and variations are possible in light of the above teaching.

What is claimed is:

1. A fluid level sensor comprising:
control logic; and
an array of sensing locations to detect a level of fluid in a container comprising:
a number of memory cells located at a number of sensing locations in the array of sensing locations;
a word line coupled to the memory cells;
a bit line coupled to the memory cells; and
a pre-charge circuit coupled to the word line and the bit line;
the control logic to:
instruct a number of field effect transistors (FETs) coupled to a bit line to disconnect from a number of the memory cells;
power up the memory cells, the powering up of the memory cells causing the memory cells to take a first state or a second state; and
output the state of the memory cells to a processing device, the state of the memory cells defining the level of the fluid in the container.

2. The fluid level sensor of claim 1, wherein outputting the state of the memory cells comprises, with the control logic:
instructing a pre-charging circuit coupled to the bit line to pre-charging the memory cells to a midpoint state;
instructing the pre-charging circuit to end the pre-charging of the memory cells; and
instructing the FETs to connect to the memory cells, wherein the output state of the memory cells is based on a presence or absence of the fluid at the sensing locations as biased by an electrical component electrically coupled to the fluid.

3. The fluid level sensor of claim 2, wherein the memory cells relay the first or second state of the memory cells to a register.

4. The fluid level sensor of claim 1, wherein the sensing locations define a plurality of fluid levels.

5. The fluid level sensor of claim 1, wherein the memory cell comprises:
the number of FETs coupled to the word line and the bit line;
a number of inverters coupled to the FETs; and
a first capacitor to bias the memory cell,
wherein the electrical component comprises a second capacitor in capacitive contact with a fluid container, the second capacitor biasing the memory cell to the first state or the second state,
wherein whether the memory cell is biased to the first state or the second state is based on which of the first capacitor or the second capacitor has a larger capacitance.

6. The fluid level sensor of claim 1, wherein the memory cell comprises:
the number of FETs coupled to the word line and the bit line;
a number of inverters coupled to the FETs; and
a first capacitor to bias the memory cell,
wherein the electrical component comprises an electrode in electrical contact with a fluid container, the electrode biasing the memory cell to the first state or the second state based on a level of conductance at the electrode.

7. A print cartridge comprising:
a fluid level sensor comprising an array of sensing locations, each sensing location associated with a different fluid level in a plurality of fluid levels to detect a level of printable fluid within the print cartridge, wherein the fluid level sensor comprises:
control logic,
wherein each sensing location comprises:
a memory cell located at each of the sensing locations in the array of sensing locations, each memory cell comprising an electrical component responsive to presence or absence of fluid at that sensing location and to put the memory cell in a first state or second state accordingly;
a word line coupled to the memory cells;
a bit line coupled to the memory cells; and
a pre-charge circuit coupled to the word line and the bit line;
the control logic to:
output the state of the memory cells to a processing device, the state of the memory cells defining the level of the fluid in the container.

8. The printer cartridge of claim 7, wherein the control logic controls actuation of the sensing locations.

9. The print cartridge of claim 7, wherein the memory cell is a static random access memory (SRAM) device within a SRAM column, one of a plurality of SRAM devices within the SRAM column each being associated with the array of sensing locations.

10. The print cartridge of claim 7, wherein the memory cell comprises:
a number of field-effect transistors (FETs) coupled to the word line and the bit line;
a number of inverters coupled to the FETs; and
a first capacitor to bias the memory cell,
wherein the electrical component comprises a second capacitor in capacitive contact with a fluid container, the second capacitor biasing the memory cell to the first state or the second state, wherein whether the memory cell is biased to the first state or the second state is based on which of the first capacitor or the second capacitor has a larger capacitance.

11. The printer cartridge of claim 7, wherein the memory cell comprises:
   a number of field-effect transistors (FETs) coupled to the word line and the bit line;
   a number of inverters coupled to the FETs; and
   a first capacitor to bias the memory cell,
   wherein the electrical component comprises an electrode in electrical contact with a fluid container, the electrode biasing the memory cell to the first state or the second state based on a level of conductance at the electrode.

12. The printer cartridge of claim 7, wherein the pre-charge circuit applies a ½ $V_{DD}$ to the bit line and a bit line bar to pull the state of the memory cells to a midpoint state.

13. The printer cartridge of claim 12, wherein the pre-charge circuit comprises:
   two pre-charging FETs, the ½ $V_{DD}$ being applied to the two pre-charging FETs; and
   a shorting FET to short the bit line and the bit line bar to balance the bit line with the bit line bar.

14. The print cartridge of claim 7, the control logic to further:
   instruct a number of field effect transistors (FETs) coupled to a bit line to disconnect from a number of the memory cells; and
   power up the memory cells, the powering up of the memory cells causing the memory cells to take a first state or a second state.

15. The print cartridge of claim 7, the electrical component arranged to be electrically coupled to fluid at a level of the corresponding sensing location within the print cartridge.

16. The print cartridge of claim 7, wherein a density of the sensing locations varies along a length of the fluid level sensor.

17. The print cartridge of claim 7, further comprising a bias capacitor, the electrical component of each memory cell comprising a capacitor, wherein, if capacitance of the capacitor is greater than capacitance of the bias capacitor, the memory cell adopts a state that indicates a corresponding sensing location is in contact with fluid.

18. The print cartridge of claim 7, further comprising a bias capacitor, the electrical component of each memory cell comprising an electrode, wherein, if conductance through the electrode is greater than conductance of the bias capacitor, the memory cell adopts a state that indicates a corresponding sensing location is in contact with fluid.

19. A method of detecting a level of fluid in a container comprising:
   disconnecting a number of field effect transistors (FETs) coupled to a bit line from a number of memory cells located at a number of sensing locations in an array of sensing locations;
   powering up the memory cells, the powering up of the memory cells causing the memory cells to take a first state or a second state; and
   reading the state of the memory cells to determine a level of fluid in a container comprising:
      with a pre-charging circuit coupled to the bit line, pre-charging the memory cells to a midpoint state;
      ending the pre-charging of the memory cells; and
      connecting the FETs to the memory cells,
      wherein the state of the memory cells is based on a presence or absence of fluid at the sensing locations as biased by an electrical component electrically coupled to the fluid.

20. The method of claim 19, wherein the powering up of the memory cells to cause the memory cells to take a first state or a second state is based on a bias applied to the memory cell from a first capacitor and an electrical component coupled to the memory cell.

* * * * *